US008902322B2

(12) United States Patent
Ramsay et al.

(10) Patent No.: US 8,902,322 B2
(45) Date of Patent: Dec. 2, 2014

(54) SYSTEMS AND METHODS FOR GENERATING SPHERICAL IMAGES

(71) Applicant: Bubl Technology Inc., Toronto (CA)

(72) Inventors: Sean Geoffrey Ramsay, Toronto (CA); Daniel Chantal Mills, Toronto (CA); Dylan Stephen Horvath, Toronto (CA); Scott Andrew Robinson Bodaly, Toronto (CA)

(73) Assignee: Bubl Technology Inc., Toronto (CA)

( * ) Notice: Subject to any disclaimer, the term of this patent is extended or adjusted under 35 U.S.C. 154(b) by 77 days.

(21) Appl. No.: 13/673,642

(22) Filed: Nov. 9, 2012

(65) Prior Publication Data
US 2014/0132788 A1 May 15, 2014

(51) Int. Cl.
H04N 5/225 (2006.01)

(52) U.S. Cl.
CPC .................................. H04N 5/2258 (2013.01)
USPC ....................................................... 348/218.1

(58) Field of Classification Search
CPC .................................................... H04N 5/2258
USPC ....................................................... 348/218.1
See application file for complete search history.

(56) References Cited

U.S. PATENT DOCUMENTS

| 5,023,725 | A | | 6/1991 | McCutchen | |
| 5,703,604 | A | | 12/1997 | McCutchen | |
| 6,141,034 | A | * | 10/2000 | McCutchen | 348/36 |
| 6,252,603 | B1 | | 6/2001 | Oxaal | |
| 6,879,338 | B1 | * | 4/2005 | Hashimoto | 348/36 |
| 6,915,008 | B2 | | 7/2005 | Barman et al. | |
| 6,947,059 | B2 | | 9/2005 | Pierce et al. | |
| 7,382,399 | B1 | | 6/2008 | McCall et al. | |
| 7,429,997 | B2 | | 9/2008 | Givon | |
| 7,542,035 | B2 | | 6/2009 | Oxaal | |
| 7,656,403 | B2 | | 2/2010 | Grover et al. | |
| 7,872,665 | B2 | | 1/2011 | Grover | |

(Continued)

FOREIGN PATENT DOCUMENTS

| WO | WO 01/22728 A1 | 3/2001 |
| WO | WO 2007/014293 A1 | 2/2007 |

OTHER PUBLICATIONS

Point Grey Research, Inc., Complete Product Catalog, Dec. 2012, 11 pages.

(Continued)

Primary Examiner — James Hannett
(74) Attorney, Agent, or Firm — D. Peter Hochberg; Sean F. Mellino; Richard A. Wolf

(57) ABSTRACT

An imaging system comprises four image sensors each pointing outwardly from the vertices of a notional tetrahedron with the optical axes of the image sensors substantially collinear with respective medians of the notional tetrahedron, with the focal plane array of each image sensor positioned between the lens system of its respective image sensor and the centroid of the notional tetrahedron. The imaging system and can be used to obtain image data for generating a spherical image of the space surrounding the imaging system. A method for generating a spherical image from this image data assigns spherical coordinates to the pixels in the images according to a cylindrical projection that is individually aligned with the image plane of each image, and blends overlapping pixels and fills blank pixel spaces. The method can be applied to image data representing outward views from the vertices or centroids of faces of any Platonic solid.

30 Claims, 32 Drawing Sheets

(56) References Cited

U.S. PATENT DOCUMENTS

| | | |
|---|---|---|
| D690,344 S | 9/2013 | Hollinger |
| 8,786,719 B2 * | 7/2014 | Chao et al. ................. 348/218.1 |
| 2004/0183941 A1 | 9/2004 | McCutchen |
| 2007/0253704 A1 | 11/2007 | Clemens |
| 2008/0074500 A1 | 3/2008 | Chen et al. |
| 2009/0058878 A1 | 3/2009 | Sasagawa |
| 2009/0210789 A1 | 8/2009 | Thakkar et al. |
| 2009/0284529 A1 | 11/2009 | De Aguiar et al. |
| 2010/0045773 A1 | 2/2010 | Ritchey |
| 2010/0097526 A1 | 4/2010 | Jacob |
| 2011/0109718 A1 | 5/2011 | Grover |
| 2012/0206565 A1 | 8/2012 | Villmer |
| 2013/0050405 A1 | 2/2013 | Masuda et al. |
| 2014/0132598 A1 * | 5/2014 | Narukawa, Hajime ....... 345/419 |

OTHER PUBLICATIONS

Written Opinion with International Search Report dated Feb. 10, 2014 in PCT/CA2013/000952.

* cited by examiner

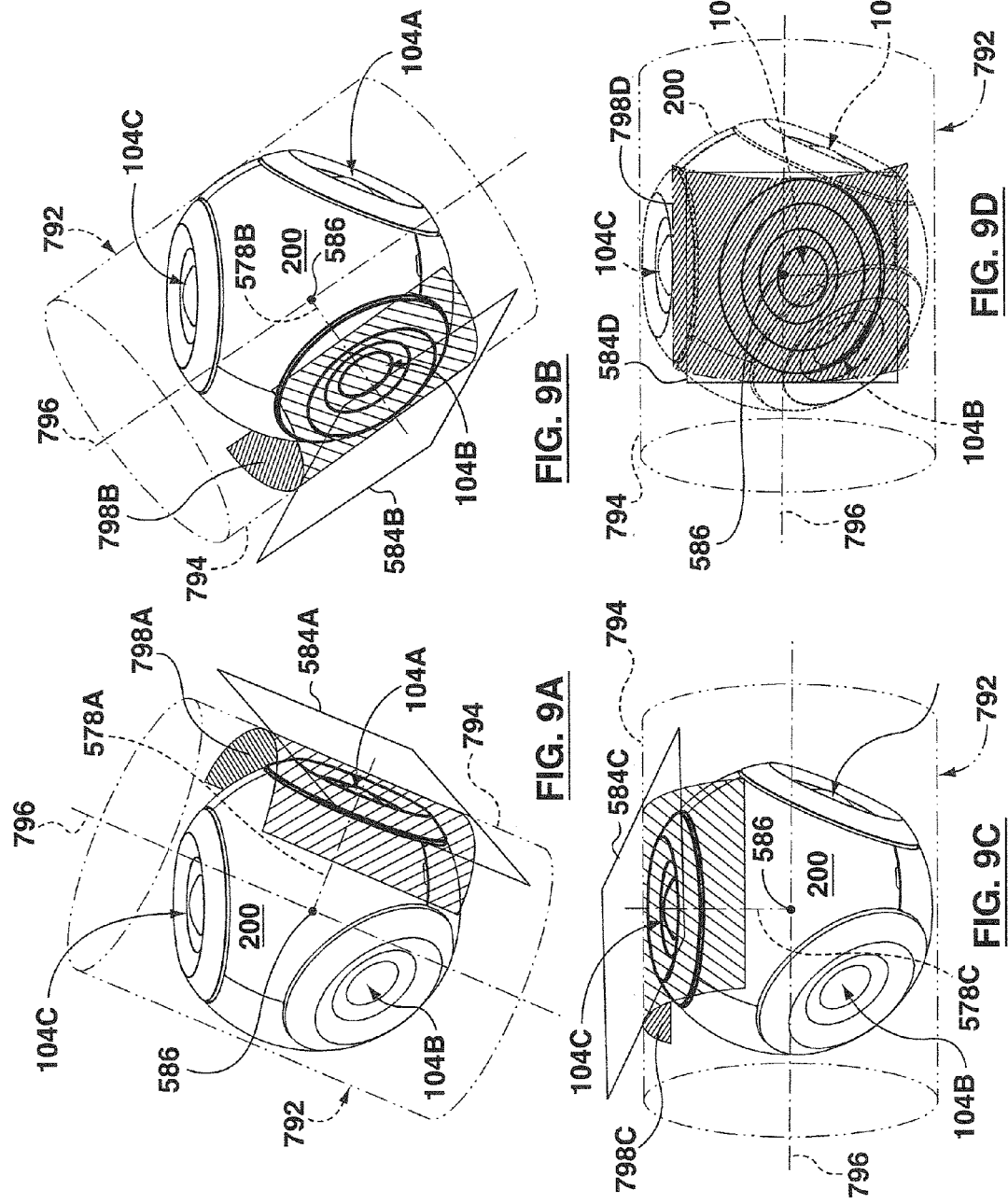

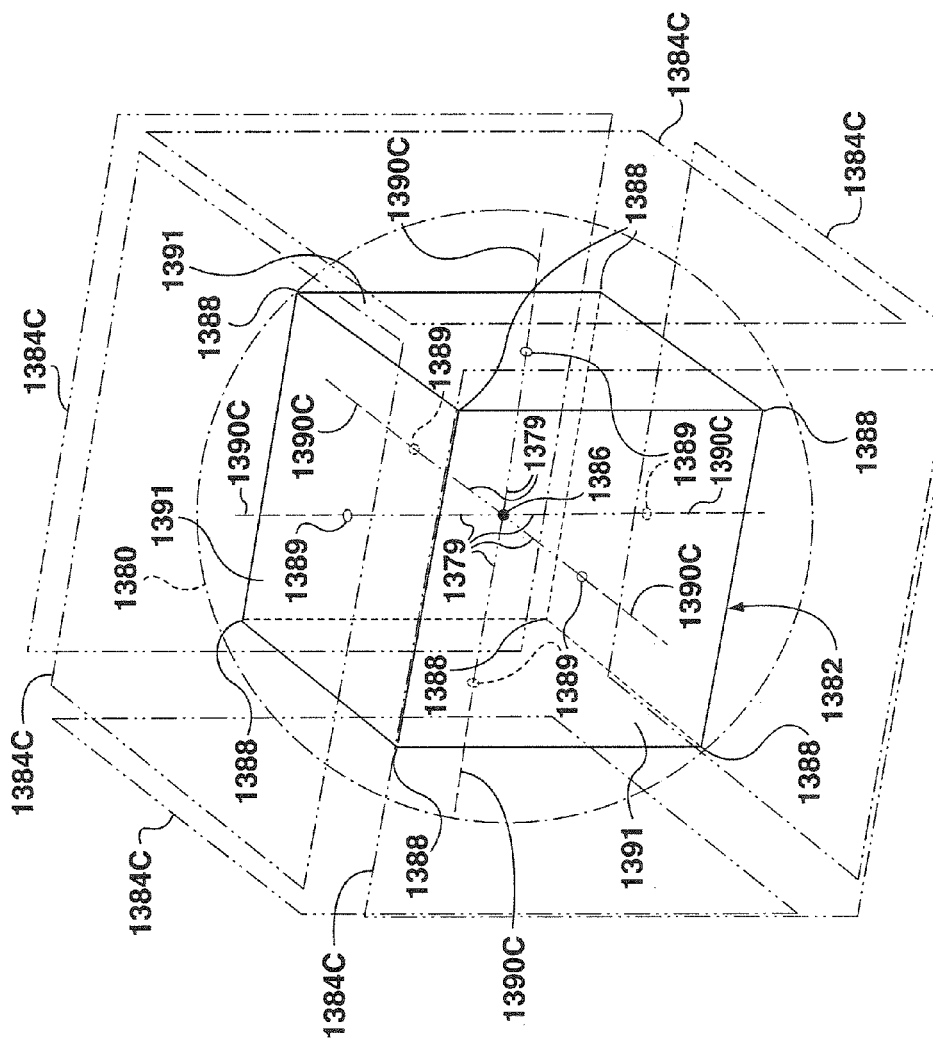

SYSTEMS AND METHODS FOR GENERATING SPHERICAL IMAGES

TECHNICAL FIELD

The present disclosure relates to imaging systems and methods, and more particularly to systems and methods for generating spherical images.

BACKGROUND

There are a wide variety of imaging systems available for recording all or substantially all of a spherical field of view.

One example of such an imaging system is a dual hemispherical lens system, in which two image sensors each having a 180 degree field of view are arranged in opposition to one another. The images from each sensor can then be combined to generate an image representing the entire spherical field of view. Such systems tend to suffer from high distortion.

The amount of distortion can be reduced by increasing the number of individual image sensors, although this generally increases the cost and complexity of both the imaging system itself as well as the subsequent image processing. This is because more image sensors are required and this in turn results in increased amounts of data needing to be processed to combine the individual images.

The Ladybug® brand imaging systems offered by Point Grey Research Inc., having an address at 12051 Riverside Way, Richmond, BC, Canada, V6W 1K7 use six image sensors, with five spaced-apart image sensors arranged to point outwardly from a common ring and one image sensor arranged to point axially relative the ring. However, these image sensors do not capture the entire spherical field of view.

Another type of imaging system is based on the geometry of a dodecahedron. One embodiment of this type of imaging system uses image sensors arranged to point outward from the faces of a dodecahedral housing. Such a system is described in U.S. Pat. No. 5,023,725 to McCutchen. A subsequent patent to McCutchen, U.S. Pat. No. 6,141,034 teaches another embodiment of a dodecahedral imaging system which uses divided lenses in a tetrahedral lens mount with criss-cross optics, with each image sensor recording three pentagons surrounding a single dodecahedral vertex. The divided lens system and criss-cross optics may increase the risk of misalignment between the lens system components and the cameras.

Moreover, many of the methods used to merge individual images together to represent a spherical field of view are subject to distortion because they must correlate pixel positions on a planar image with positions on a curved spherical surface.

SUMMARY

An imaging system comprises four image sensors arranged to point outwardly from the vertices of a notional tetrahedron, and can be used to obtain image data for generating a spherical image of the space surrounding the imaging system. A method for generating a spherical image from this image data assigns spherical coordinates to the pixels in the images according to a cylindrical projection that is individually aligned with the image plane of each image, and then blends overlapping pixels and fills blank pixel spaces. The method can be applied to image data representing outward views from the vertices or from the centroids of the faces of any Platonic solid.

An imaging system comprises a support frame and four image sensors carried by the support frame, with each image sensor comprising a lens system having an optical axis and a focal plane array aligned with the optical axis of the lens system. Each image sensor has a field of view that is at least substantially coterminous with the field of view of each adjacent image sensor. The image sensors are arranged so that the optical axis of each lens system is substantially collinear with a median of a common notional regular tetrahedron, each focal plane array is positioned between the lens system of its respective image sensor and a centroid of the notional tetrahedron, and each image sensor faces outwardly relative to the centroid of the notional tetrahedron.

Each image sensor preferably has a field of view of at least 129.5 degrees. Preferably, each image sensor has a field of view that overlaps the field of view of each adjacent image sensor, and each image sensor preferably has a field of view of at least 135 degrees, more preferably a field of view of at least 165 degrees, and still more preferably a field of view of between about 165 degrees and about 170 degrees.

An exemplary method for generating a spherical image, comprises receiving four images. Each image defines an image plane representing a field of view from a unique vertex of a notional regular tetrahedron outwardly along an optical axis that is substantially collinear with a notional line between the centroid of the notional tetrahedron and the respective vertex. The field of view of each image is at least substantially coterminous with the field of view of each adjacent image. The method further comprises assigning, to each pixel in each image, a spherical coordinate on a notional sphere according to a cylindrical projection aligned with the image plane for that image, and using the spherical coordinates to assign colours derived from the pixels to pixel positions in a spherical image according to a spherical image template. The notional sphere intersects the vertices of the notional tetrahedron, is centred on the centroid of the notional tetrahedron, and the image plane of each image is substantially tangential to the notional sphere. The cylindrical projection is aligned with the image plane for that image by a notional cylinder of the cylindrical projection having its cylinder wall substantially tangential to the image plane and its longitudinal axis intersecting the centroid of the notional tetrahedron.

In one embodiment, each image defines an image plane representing a field of view of at least 129.5 degrees, preferably at least 135 degrees, more preferably at least 165 degrees and still more preferably between about 165 degrees and about 170 degrees.

The above-described method is a specific implementation of a more general method for generating a spherical image. The more general method comprises receiving a set of images in which each image defines an image plane representing a field of view from a unique surrounding point of a notional Platonic solid outwardly along an optical axis substantially collinear with a notional line between a centroid of the notional Platonic solid and the respective surrounding point. Each surrounding point is a member of a set of surrounding points selected from the group consisting of (a) the set of all vertices of the notional Platonic solid and (b) the set of all centroids of faces of the notional Platonic solid, and the number of images in the set is equal to the number of surrounding points in the selected set of surrounding points for the notional Platonic solid. Thus, in one embodiment the set of surrounding points is the set of surrounding points is the set of all vertices of the notional Platonic solid, and in another embodiment the set of surrounding points is the set of all centroids of faces of the notional Platonic solid. The field of view of each image is at least substantially coterminous with the field of view of each adjacent image. The method then assigns, to each pixel in each image, a spherical coordinate on a notional sphere according to a cylindrical projection aligned with the image plane for that image, and uses the spherical coordinates to assign colours derived from the pixels to pixel positions in the spherical image according to a spherical image template. The notional sphere intersects the vertices of the notional Platonic solid, is centred on the centroid of the notional Platonic solid, and the image plane of each image is substantially tangential to the notional sphere. The cylindrical projection is aligned with the image plane for that image by a notional cylinder of the cylindrical projection having its cylinder wall substantially tangential to the image plane and its longitudinal axis intersecting the centroid of the notional Platonic solid.

In the above-described methods, the field of view of each image preferably overlaps the field of view of each adjacent image.

The spherical image template used in the above methods may be, for example, an equirectangular image template.

In some embodiments of the above-described methods, assigning the spherical coordinates to the respective pixels according to the cylindrical projection aligned with the image plane for that image comprises assigning the spherical coordinates to the respective pixels according to a precalculated lookup table derived from the cylindrical projection. The spherical coordinates in the precalculated lookup table may include position adjustments for distortion correction in addition to being derived from the cylindrical projection. In certain preferred embodiments of the above-described methods, the cylindrical projection is a Miller cylindrical projection.

In particular embodiments of the above-described methods, assigning the spherical coordinates to each pixel in each image results in unique pixels each having a unique spherical coordinate and pixel groups, with each pixel group comprising a plurality of pixels whose spherical coordinates are identical. In such embodiments, using the spherical coordinates to assign colours to the pixel positions in the spherical image according to the spherical image template may comprise, for each pixel position in the spherical image that maps to a spherical coordinate assigned to a unique pixel, assigning the colour of that unique pixel to that pixel position in the spherical image, and for each pixel position in the spherical image that maps to a spherical coordinate assigned to the plurality of pixels in a pixel group, assigning to that pixel position in the spherical image a colour blended from the plurality of pixels in the pixel group. Such embodiments of the above-described method may further comprise, for each pixel position in the spherical image that maps to a spherical coordinate remaining unassigned to any pixel, assigning to that pixel position in the spherical image a colour determined by oversampling nearby pixel positions in the spherical image.

The methods may further comprise correcting each image for distortion.

Each image may be one image in a video stream comprising a plurality of images.

The images when received may be multiplexed into a single composite image, in which case the above methods may further comprise isolating each image from the composite image before finding, for each pixel in each image, the spherical coordinate representing the projection of that pixel onto the surface of the notional sphere.

Computer program products comprising tangible computer-usable media embodying instructions for carrying out the above-described methods, and computer systems for implementing the above-described methods, are also disclosed.

BRIEF DESCRIPTION OF THE DRAWINGS

These and other features will become more apparent from the following description in which reference is made to the appended drawings wherein:

FIGS. 9A to 9D show the arrangement of the image planes in the geometric arrangement shown in FIG. 5, relative to the exemplary physical embodiment of FIG. 2A with its orientation held constant, and show the different orientations of the notional cylinder that align the cylindrical projection with each respective image plane;

FIG. 13C shows a geometric arrangement of image planes for images to be used to generate a spherical image according to the method of FIG. 11 where the notional Platonic solid is a notional cube and the surrounding points are centroids of the faces of the cube;

DETAILED DESCRIPTION

Figure 1:
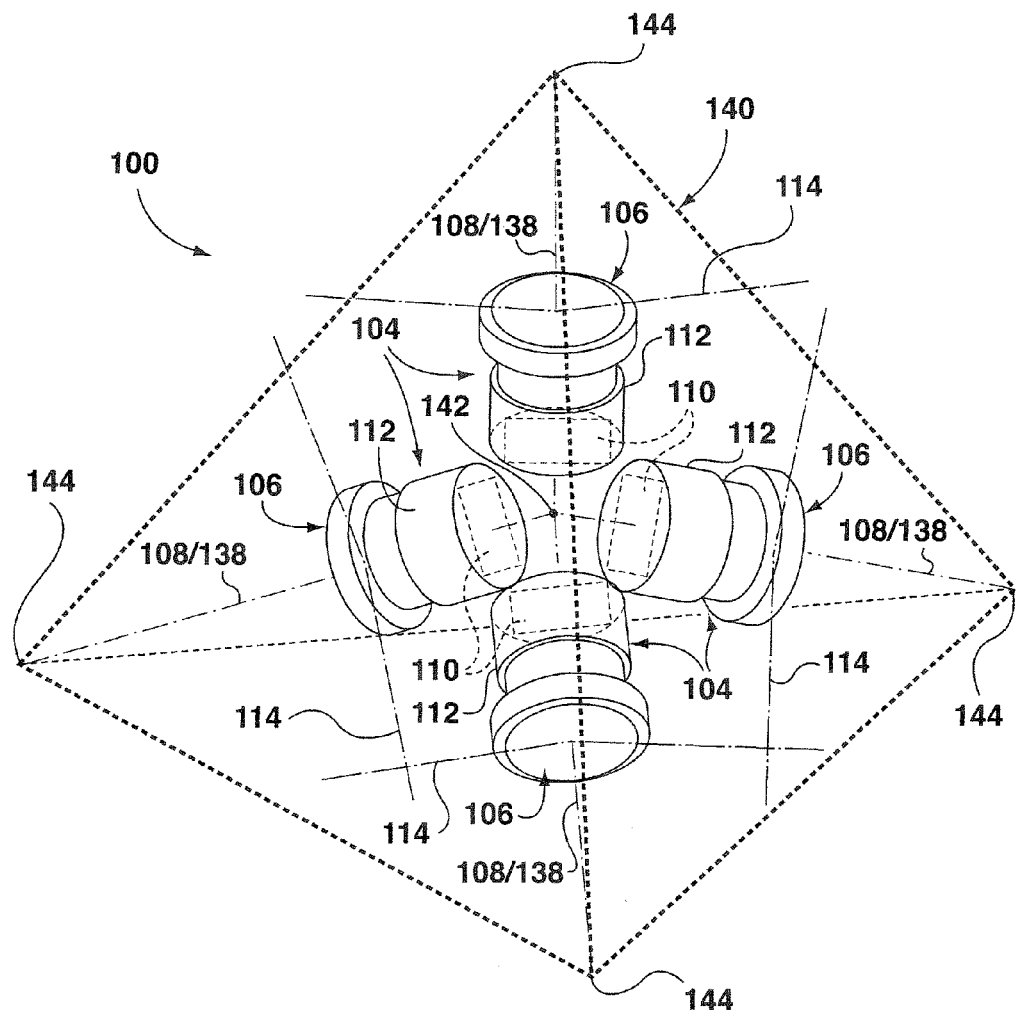
FIG. 1 shows an exemplary geometric arrangement of four image sensors for a tetrahedral imaging system.
Figure 2A:
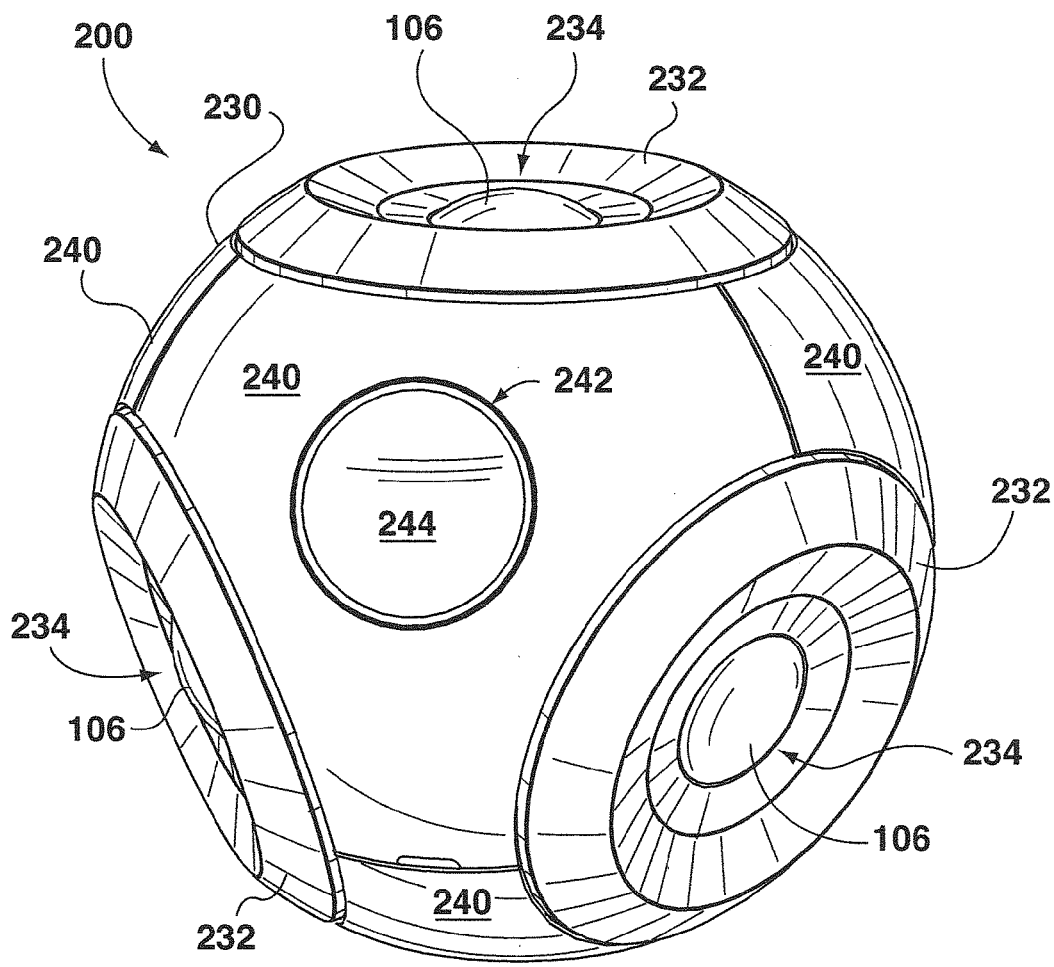
FIG. 2A is a perspective view of an exemplary physical embodiment of the tetrahedral imaging system of FIG. 1.
Figure 2B:
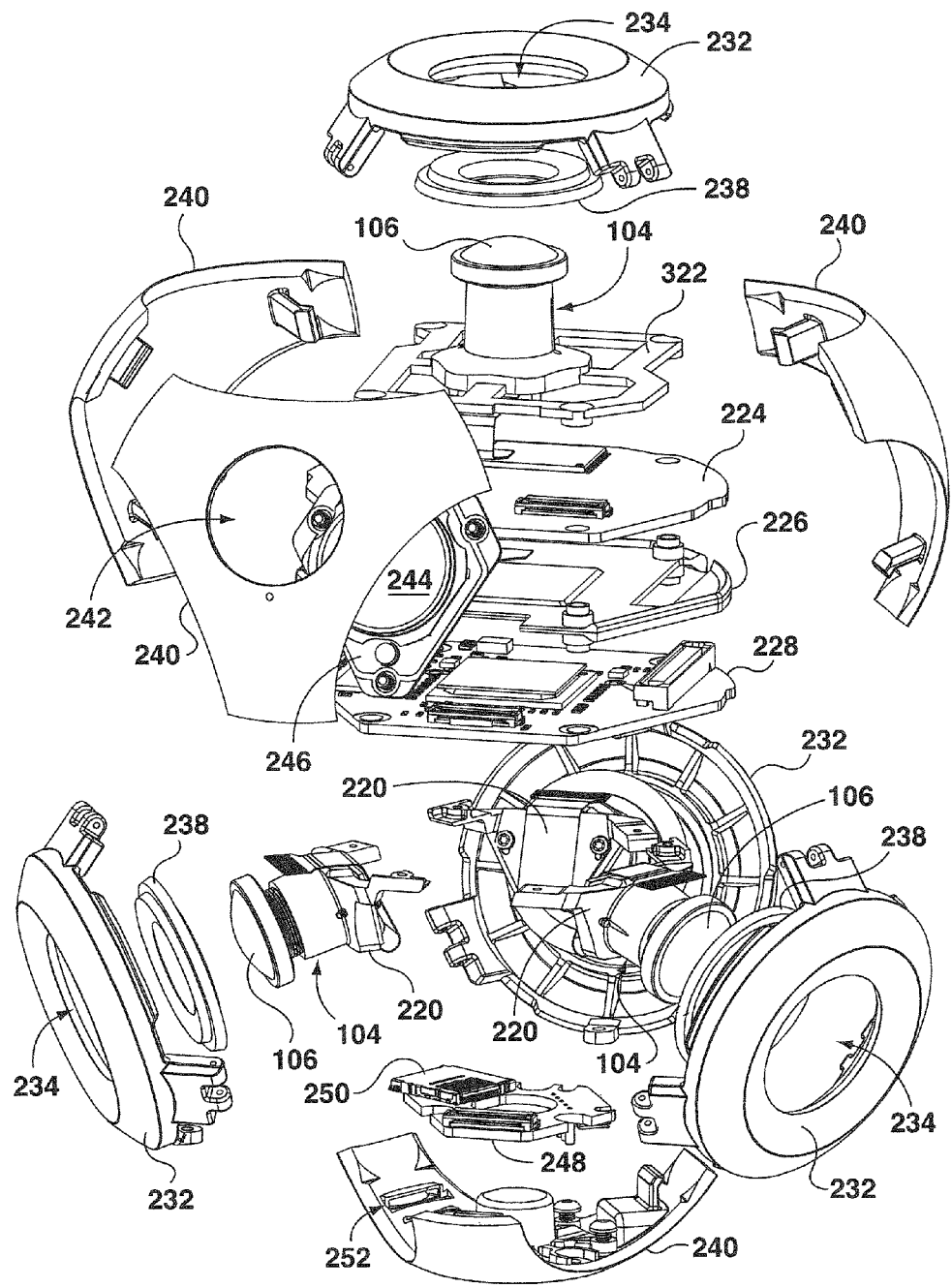
FIG. 2B is an exploded perspective view of the exemplary physical embodiment shown in FIG. 2A.

Reference is now made to FIG. 1, which shows an exemplary geometric arrangement 100 of four image sensors 104 for a tetrahedral imaging system. An exemplary physical construction for a tetrahedral imaging system is shown in FIGS. 2A and 2B and described below. A tetrahedral imaging system can be used to capture image data representing the space surrounding the tetrahedral imaging system, and this image data can then be used to generate a spherical image, such as an equirectangular image, of that surrounding space, for example according to one of the methods described below. The image sensors 104 each comprise a lens system 106 having an optical axis 108 and a focal plane array 110 aligned with the optical axis 108 of the respective lens system 106. In the exemplary geometric arrangement 100 shown in FIG. 1, the lens system 106 and the focal plane array 110 of each image sensor 104 is carried by a respective sensor housing 112 which supports the lens system 106 and focal plane array 110 and maintains alignment of the focal plane array 110 with its respective optical axis 108.

In the exemplary geometric arrangement 100 shown in FIG. 1, the four image sensors 104 are maintained in a tetrahedral arrangement relative to one another. In particular, in the tetrahedral arrangement the optical axis 108 of each lens system 106 is substantially collinear with a median 138 of a notional regular tetrahedron 140 and each focal plane array 110 is positioned between the lens system 106 of its respective image sensor 104 and the centroid 142 of the notional tetrahedron 140. As can be seen in FIG. 1, each image sensor 104 faces outwardly relative to the centroid of the notional tetrahedron Taking the centroid 142 of the notional tetrahedron 140 as the origin in a Cartesian coordinate system and treating one lens system (referred to as Lens System 1) as being collinear with the z-axis, the unit vectors for the optical axes 108 for the respective lens systems 106 have the coordinates specified in the table below:

| Direction | Lens System 1 | Lens System 2 | Lens System 3 | Lens System 4 |
|---|---|---|---|---|
| X | 0 | 0 | 0.75 | −0.75 |
| Y | 0 | 0.866 | −0.433 | −0.433 |
| Z | 1 | −0.5 | −0.5 | −0.5 |

Tetrahedral imaging systems are scalable in size as long as the above geometry is retained. Larger versions will allow for larger lens assemblies and larger focal plane arrays to obtain higher resolution images, and will have space for additional onboard image processing and other electronics, while smaller versions will be more portable and can communicate with off-board electronics for data storage, image processing and other functions.

Continuing to refer to FIG. 1, each image sensor 104 has a field of view 114 that is at least substantially coterminous with (i.e. just touches the edge of) the field of view 114 of each adjacent image sensor 104. For the tetrahedral arrangement of image sensors 104 shown in FIG. 1, a field of view of 129.5 degrees will be coterminous. Preferably, each image sensor 104 has a field of view 114 that overlaps the field of view 114 of each adjacent image sensor 104. As such, each image sensor 104 preferably has a field of view 114 of at least 135 degrees, more preferably at least 165 degrees, and most preferably between about 165 degrees and about 170 degrees. Thus, each image captured by one of the image sensors 104 will define an image plane representing a field of view 114 of at least 129.5 degrees outwardly along an optical axis 108 that is substantially collinear with the median 138 from the respective vertex 144, i.e. the optical axis 108 is collinear with the notional line extending between the centroid 142 of the notional tetrahedron 140 and the respective vertex 144 of the notional tetrahedron 140.

The arrangement of the image sensors 104 relative to one another, in combination with the field of view 114 of each image sensor 104, enables the image sensors 104 to collectively obtain sufficient image data to generate a spherical image, such as an equirectangular image, of the space surrounding the imaging system 100, for example according to the method described below.

Although shown in FIGS. 1, 2A and 2B as consisting of a single lens simply for ease of illustration, the lens systems 106 of the image sensors may comprise a plurality of individual lenses. The focal plane arrays 110 may be, for example, CMOS (complementary metal-oxide semiconductor) or CCD (charge-coupled device) sensors. The sensor housings 112 may be of one piece construction or of multi-piece construction. Preferably, the image sensors 104 do not include a mechanical zoom/magnification feature, although they may include mechanisms for adjusting the focus of the respective image sensor 104. The sensor housings 112 may have any suitable shape. The image sensors 104 may be conventional image sensors as are known in the art, or may be image sensors that become available subsequent to the filing hereof. In a presently preferred embodiment, the lens systems 106 each comprise a Lensagon model BFM1220c lens, offered by Lensation GmbH, having an address at Unterer Dammweg 12, 76149 Karlsruhe, Germany and the focal plane arrays 110 each comprise an OmniVision model OV5650 CMOS image sensor, offered by OmniVision Technologies, having an address at 4275 Burton Drive, Santa Clara, Calif. 95054, USA.

Reference is now made to FIGS. 2A and 2B, which show a currently preferred physical embodiment 200 of the exemplary imaging system 100. The physical construction shown in FIGS. 2A and 2B is exemplary only, and many other physical structures may be used to maintain the image sensors in the desired tetrahedral relationship.

Referring now specifically to FIG. 2B, in the exemplary physical embodiment 200 the support frame comprises three harnesses 220 and an image sensor support base 322. The three harnesses are secured to one another to form a main frame which holds three of the image sensors 104, and the fourth image sensor 104 is carried by the image sensor support base 322, which is in turn carried by the main frame formed by the three harnesses 220. A printed circuit board (PCB) 224 for the onboard processor 354 (FIG. 3), a heat sink 226 and a PCB 228 for the video mixer 350 (FIG. 3) are sandwiched between the image sensor support base 322 and the main frame formed by the three harnesses 220.

The image sensors 104, harnesses 220, image sensor support base 322 and the PCBs 224, 228 and heat sink 226 are all housed within an outer shell 230 (FIG. 2A). The outer shell 230 is formed by four interconnected annular panels 232 each having its aperture 234 aligned with the lens system 106 of one of the image sensors 104. Shock rings 238 are interposed between each of the annular panels 232 and the respective image sensor 104. Four convex panels 240 fit in the spaces between the annular panels 232, giving the outer shell 230 a generally spherical shape as best seen in FIG. 2A. One of the convex panels 240 has an aperture 242 for a control interface, in this case a single button 244 on a button panel 246 carried by the support frame. Another one of the convex panels 240 carries a communication PCB 248, a female USB connector 250 in the illustrated embodiment, and this convex panel 240 includes an aperture 252 for receiving a male USB connector. For simplicity of illustration, electrical connections among components are not shown in FIG. 2B.

The image sensors 104 may be coupled via wired connection to a power supply and to a data processing system that is remote from the imaging system 100, with control of the image sensors 104 and processing of the images generated thereby being carried out entirely or substantially entirely by the off-board data processing system. Preferably, however, the image processing system 100 includes an onboard power supply, an onboard processing unit, onboard data storage as well as a control interface, and may optionally include a display unit. The image processing system 100 also preferably includes a data transfer interface enabling the onboard processing unit and onboard data storage to be coupled either by wire or wirelessly, or both, to an external data processing system, such as a desktop computer, laptop computer, tablet computer, smartphone or the like. In the exemplary embodiment shown in FIGS. 2A and 2B, the data transfer interface comprises the female USB connector 250.

Figure 3:
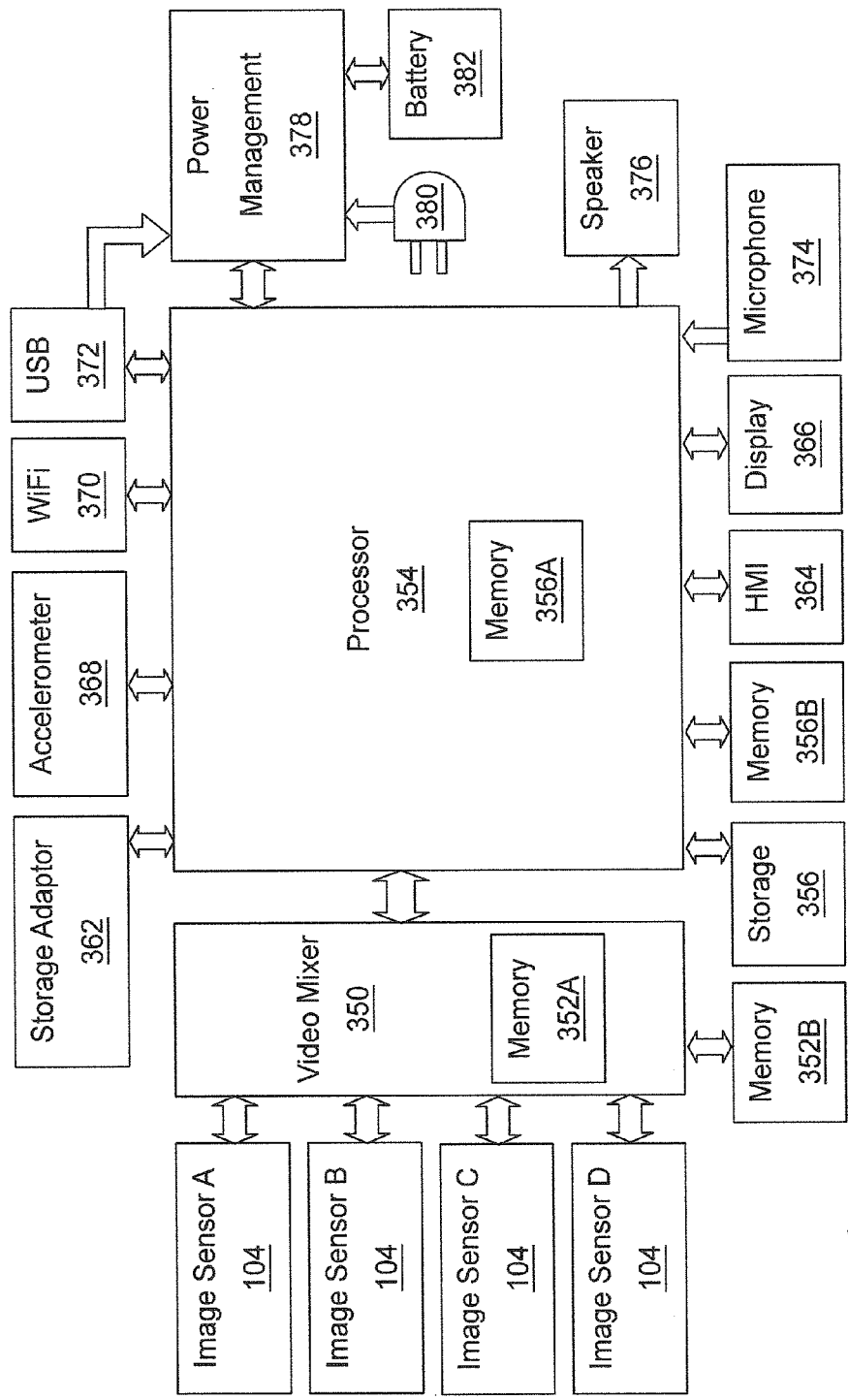
FIG. 3 shows a schematic representation of an exemplary electronic hardware arrangement for a tetrahedral imaging system.

FIG. 3 shows a schematic representation of an exemplary electronic hardware arrangement 300 for a tetrahedral imaging system. The schematic representation 300 in FIG. 3 is intended to illustrate a range of components and features that may be included in a tetrahedral imaging system, and hence does not conform precisely to the exemplary physical embodiment 200 of a tetrahedral imaging system shown in FIGS. 2A and 2B. In FIG. 3, the letters "A", "B", "C" and "D" are used to distinguish the four image sensors 104A, 104B, 104C, 104D from one another. Each of the image sensors 104A, 104B, 104C, 104D, in particular the focal plane arrays 110 thereof (FIGS. 1 and 2), communicates with an onboard video mixer 350.

Figure 3A:
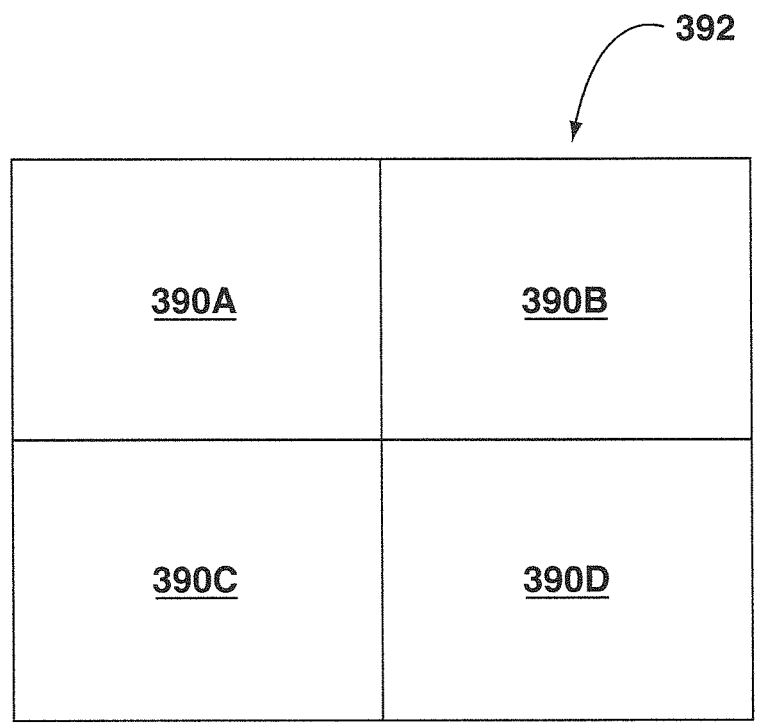
FIG. 3A shows an exemplary multiplexing arrangement.

When the image sensors 104A, 104B, 104C, 104D are initiated, the video mixer 350 synchronizes them to ensure that each one is producing images at substantially the same instant to obviate effects of object movement within the image(s) or movement of the imaging system 100. When active, each image sensor 104A, 104B, 104C, 104D transmits a video stream, preferably at 30 frames per second, to the video mixer 350. The video mixer 350 processes the images contained in the video streams received from the image sensors 104A, 104B, 104C, 104D and synchronizes and multiplexes the four individual video streams into a single multiplexed video stream, also preferably at 30 frames per second. FIG. 3A shows a presently preferred multiplexing arrangement, in which the individual images 390A, 390B, 390C, 390D from each image sensor 104A, 104B, 104C, 104D are combined into a single composite image 392 with one individual image 390A, 390B, 390C, 390D in each quadrant of the composite image 392. The multiplexed video stream comprises a time-ordered series of these composite images 392. The images 390A, 390B, 390C, 390D in the video streams from the image sensors 104A, 104B, 104C, 104D are synchronized by the video mixer 350 so that each image 390A, 390B, 390C, 390D in a given composite image 392 in the multiplexed video stream corresponds to substantially the same moment in time. In one embodiment, the composite image is 1440 by 1440 pixels and each quadrant is 720 by 720 pixels. Preferably, the resolution of each individual image 390A, 390B, 390C, 390D in the composite image 392 is lower than the actual resolution of the focal plane arrays 110 on the respective image sensors 104A, 104B, 104C, 104D so as to facilitate faster data throughput. To improve the crispness and colour depth of the individual images 390A, 390B, 390C, 390D in the composite image 392 while reducing image noise, a process of "binning", that is, combining a cluster of pixels into a single pixel whose colour is derived from the colours of the pixels in the clusters, is used when multiplexing the images.

The video mixer 350 also transmits control signals to the image sensors 104. The video mixer 350 may include built-in memory 352A, or may communicate with memory 352B external to the video mixer 350, or both. In a currently preferred embodiment, the video mixer 350 is an Altera Cyclone IV model EP4CE55 field-programmable gate array (FPGA) offered by Altera Corporation, having an address at 101 Innovation Drive, San Jose, Calif. 95134, USA.

Continuing to refer to FIG. 3, the imaging system 100 further comprises an onboard processor 354. The processor 354 includes built-in memory 356A, and the imaging system 100 may include optional additional memory 356B coupled to the processor 354. The processor may be, for example, a multipoint control unit or an FPGA, or another type of processor. In a presently preferred embodiment, the processor 354 is a model TMS320DM368 processor offered by Texas Instruments Inc., having an address at 12500 TI Boulevard, Dallas, Tex. 75243 USA (mailing address: P.O. Box 660199, Dallas, Tex. 75266-0199, USA). In addition, the imaging system 100 comprises a storage adaptor 362, a human-machine interface (HMI) 364, a graphical display 366, a tri-axial accelerometer 368, a wireless module 370, an external communication adaptor 372, a microphone 374, an optional speaker 376 and a power management module 378, each of which is discussed further below.

The processor 354 communicates with, and receives the multiplexed video stream from, the video mixer 350. The processor 354 also compresses the multiplexed video stream into a compressed, multiplexed video stream for storage and/or transmission. Compression is preferably according to the H.264 video compression format, although other formats (e.g. JPEG compression) may also be used or compression may be omitted. Optionally, the imaging system 100 may include a separate encoder for performing the compression.

In the exemplary embodiment shown in FIG. 3, the processor 354 communicates with the storage adaptor 362, which can receive a removable storage device. In a preferred embodiment, the storage adaptor 362 is an onboard memory card slot, for example a secure digital (SD) memory card slot, which may be any of a standard SD card slot, a mini-SD memory card slot or a micro-SD memory card slot. Other types of memory card slots may also be used. Alternatively or additionally, the imaging system 100 may include non-removable storage 356, such as flash memory. The processor 354 also communicates with the HMI 364 and the graphical display 366. The HMI 364 may consist of one or more buttons for providing instructions to the processor 354 for controlling the operation of the imaging system 100. For example, the HMI 364 may consist of a single button 244, as shown in FIGS. 2A and 2B, that provides different commands based on the number of times and the length of time that it is pressed, or may comprise a plurality of buttons each having one or more functions. For example, the HMI 364 may consist of six buttons marked "REC.", "STOP", "PLAY", "FF", "REV" and "MENU". The "MENU" button may cause the processor to display various options on the graphical display 366, and the user could then use the other buttons to navigate and select among those options. The graphical display 366 enables playback of video recorded by the imaging system 100. Alternatively or additionally, certain aspects of the HMI 364 and the graphical display 366 may be integrated into a combined touchscreen display. Also optionally, the graphical display 366 may be omitted. For example, one or more LEDs may be used to indicate the status of the imaging system 100.

The tri-axial accelerometer 368 is also coupled to the processor 354, and provides information about the orientation of the imaging system 100, which can be included in or associated with the multiplexed video stream in synchronization therewith. Where orientation information is not used in processing of the image data, the accelerometer 368 may be omitted.

The wireless module 370 is coupled to the processor to enable the imaging system 100 to communicate wirelessly with remote computing devices. The wireless module 370 may be, for example, a local area network (WLAN) module conforming to IEEE 802.11 standards (i.e. a Wi-Fi module). In the exemplary embodiment shown in FIG. 3, the wireless module 370 is a Wi-Fi module. Similarly, the external communication adaptor 372 is coupled to the processor to enable the imaging system 100 to communicate with remote computing devices via a wired connection. In the exemplary illustrative embodiment shown in FIG. 3, the external communication adaptor 372 is a universal serial bus (USB) connector although other types of external communication adaptor may also be used.

The imaging system 100 preferably includes a microphone 374 coupled to the processor 354 to enable sound to be recorded in association with the video and also preferably includes an optional speaker 376 to play back recorded sound. The imaging system 100 further comprises a power management module 378 to deliver electrical power to the various components. The power management module 378 is coupled to the processor 354, which controls the power management module 378, and is also coupled to the USB connector 372, an external electrical connection 380 (e.g. a connector for a removable power cord) on the imaging device 100 and to one or more onboard batteries 382. The power management module 378 can receive electrical power from any one of the USB connection 372, the external electrical connection 380 and the one or more onboard batteries 382 and condition and deliver that electrical power to the various components, and can also condition and use electrical power from the USB connection 372 and the external electrical connection 380 to charge the one or more onboard batteries 382. In other embodiments, the components may draw power directly, and only, from the one or more onboard batteries 382, and the power management module 378 may be limited to receiving and conditioning power from the USB connection 372 and the external electrical connection 380 and managing the one or more batteries 382.

Figure 4:
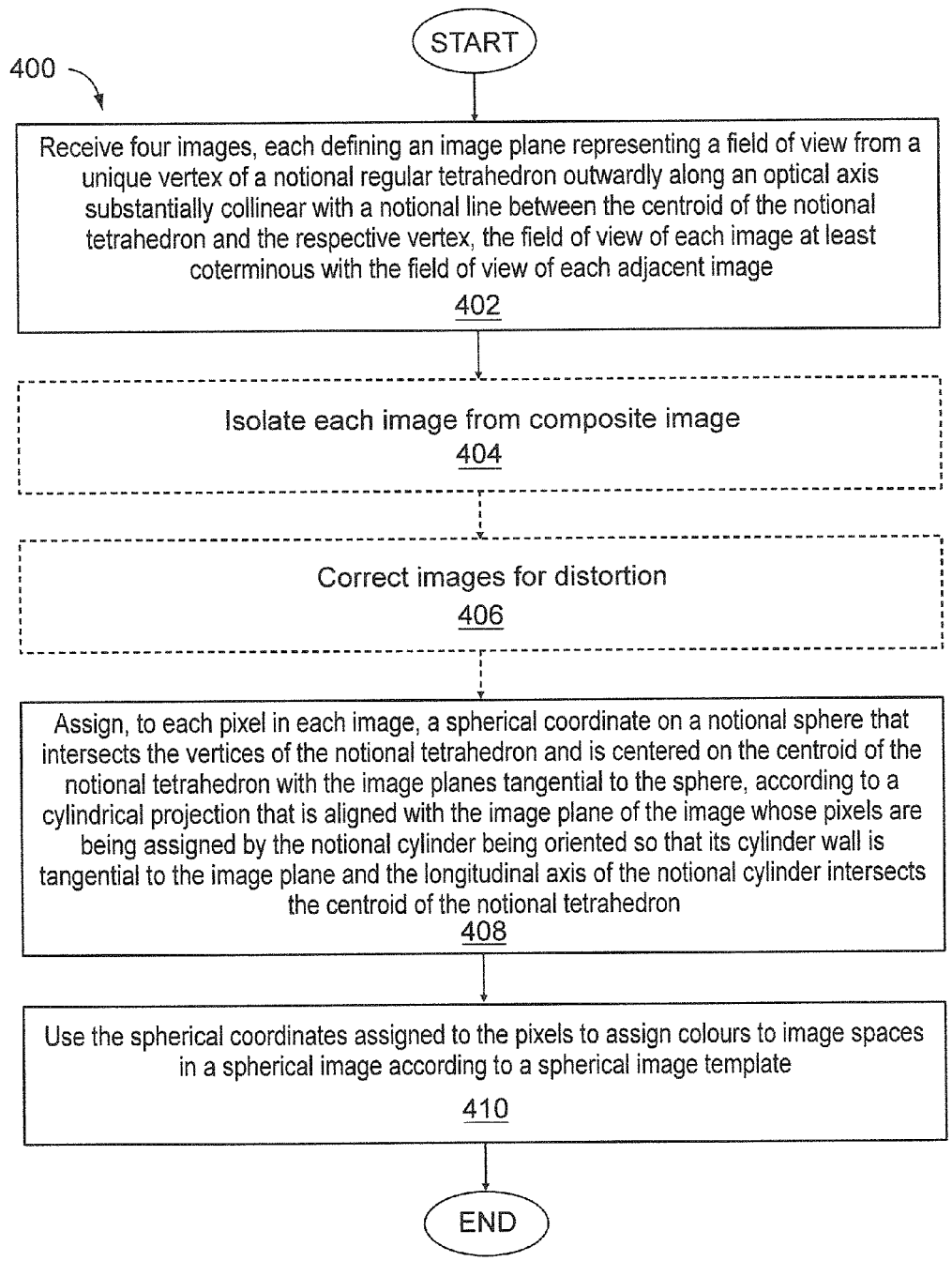
FIG. 4 is a flow chart showing an exemplary method for generating a spherical image based on tetrahedral geometry.
Figure 5:
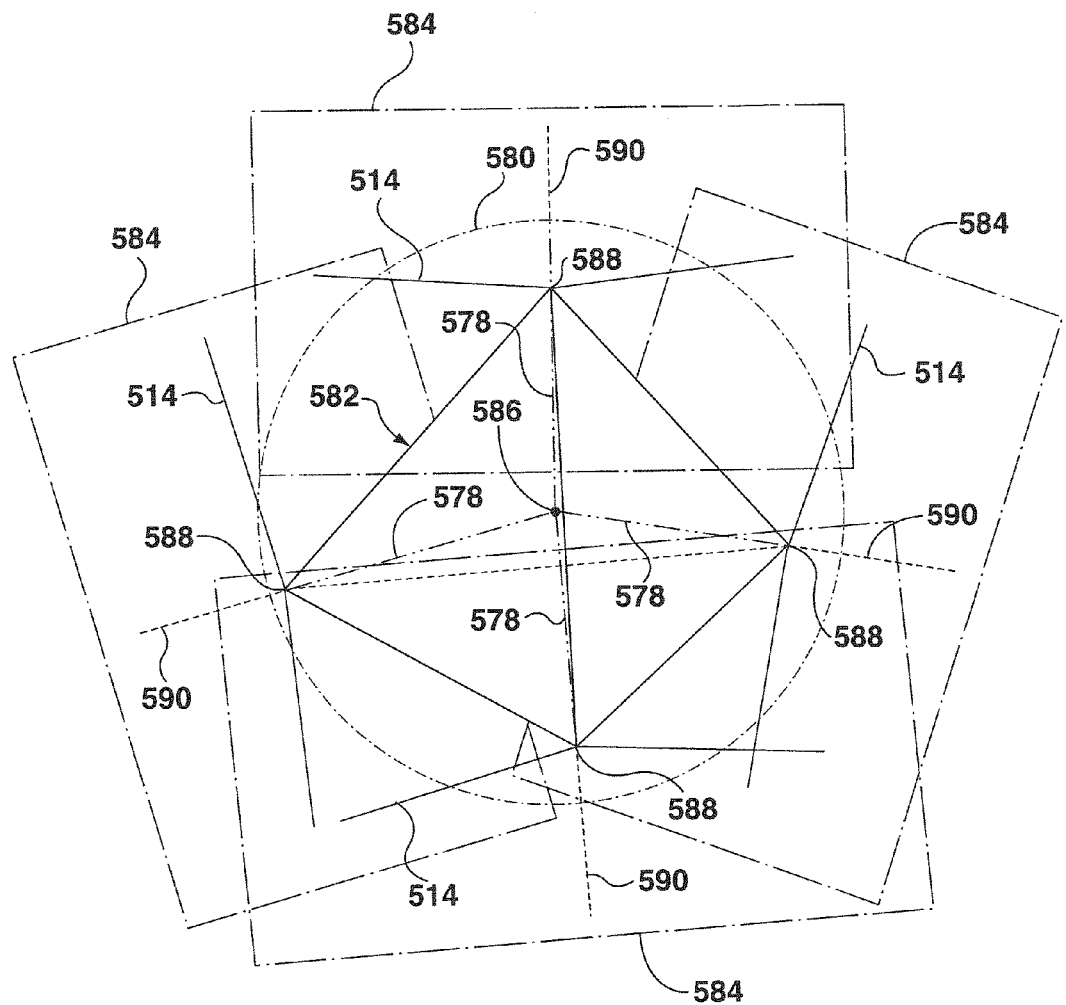
FIG. 5 shows a geometric arrangement of image planes for images to be used to generate a spherical image according to the method of FIG. 4.

FIG. 4 is a flow chart showing an exemplary method 400 for generating a spherical image, such as an equirectangular image. At step 402, the method 400 receives four images. Referring now to FIG. 5, each of the four images received at step 402 defines an image plane 584 representing a field of view 514 from a unique vertex 588 of a notional regular tetrahedron 582 outwardly along an optical axis 590 substantially collinear with a notional line 578 between the centroid 586 of the notional tetrahedron and the respective vertex 588 (i.e. the median for that vertex). Thus, the image plane 584 is substantially normal to the median of the notional tetrahedron 582 for its respective vertex 588, and there is one image for each vertex 588. The images may be images captured by the image sensors 104A, 104B, 104C, 104D of a tetrahedral imaging system as described above, and the method 400 may be carried out, for example, by a separate data processing system that has received those images from the tetrahedral imaging system. The field of view 514 represented by each image is at least substantially coterminous with the field of view 514 represented by each adjacent image, that is, 129.5 degrees. Preferably, the field of view 514 represented by each image overlaps the field of view 514 of each adjacent image. Each image preferably represents a field of view 514 of at least 135 degrees, more preferably at least 165 degrees, and most preferably between about 165 degrees and about 170 degrees.

Although described in respect of a single set of four images for ease of explanation, by repeated application the method 400 may be used to process four synchronized video streams where the images in each stream conform to the geometry described above and shown in FIG. 5. In such cases, the video streams may be four separate video streams, or may be multiplexed into a single composite video stream, for example as described above in respect of FIG. 3A. Where the four images are multiplexed into a single composite image, the method 400 includes an optional step 404 of isolating each image from the composite image. The isolation step 404 need not involve actually decomposing the composite image, but may consist of identifying the individual images based on known boundaries in the composite image.

At optional step 406, the method 400 corrects the images for distortion. A certain amount of distortion is inherent in any lens system, and generally increases as the field of view of the lens increases. Image distortion falls into two categories: radial distortion and decentering distortion. Radial distortions are what make a straight line appear bent on wider angle lenses, and decentering distortion results from a focal plane array being incorrectly centered behind the principle point of the lens system. Distortion correction involves adjusting the coordinate location of some or all of the pixels to a new coordinate location. Each pixel on an uncorrected image has an associated X and Y coordinate, and the correction for radial distortion and decentering distortion is applied to each image to determine a new X and Y coordinate for the pixel that places it in the distortion corrected location.

To achieve the required distortion correction, a set of generalized adjustment parameters is calculated for the particular type of image sensor (i.e. lens assembly and focal plane array) that captured the relevant image. Thus, for a tetrahedral imaging system of the type described above, where all of the image sensors 104 are of the same type, a single set of adjustment parameters is applied uniformly to all of the images. For commercially available lenses, the lens manufacturer may provide specifications that give a starting point for determining adjustment parameters for radial distortion. More precise adjustment parameters for radial distortion can be calculated using test images of targets that are easily identified in the images and located at known distances from the image sensors, to produce a dense point coverage on the four images simultaneously. The same procedure can be used to determine adjustment parameters for decentering distortion.

Once suitable adjustment parameters have been calculated for a given combination of lens assembly and focal plane array, these adjustment parameters can be applied to any tetrahedral imaging system using that combination of lens assembly and focal plane array. The distortion correction procedure is consistent and repetitive for a given combination of lens assembly and focal plane array, so the pixel correction values preferably are not calculated discretely for each image but rather by using adjustment values that are stored in lookup tables for efficiency. Uncorrected pixel positions would have a predetermined adjustment value that remaps the respective pixel to a corrected pixel position in the image to correct for the distortion, and the corrected pixel positions can be stored in the lookup table. Thus, for any given arbitrary pixel having coordinates (X, Y) in an uncorrected image, the data processing system would look up those coordinates in the lookup table and assign that pixel new coordinates ($X_C$, $Y_C$) in the corrected image according to the lookup table. Optionally, each imaging device could be individually calibrated after manufacturing and before shipping, and the lookup table could be fine tuned to account for individual factors, such as misalignment between the image sensors 104, in addition to the distortion inherent in the particular combination of lens assembly and focal plane array. Additionally, the imaging device may be provided with onboard hardware and/or software for carrying out real time calibration, for example at power up, and can dynamically update the lookup table.

The distortion correction step (step 406) may be omitted if the images received at step 402 are already sufficiently free of distortion for the subsequent steps to be carried out accurately. For example, the images may be received from a tetrahedral imaging system having onboard distortion correction capability. Preferably, as described in greater detail below, the distortion correction adjustment is incorporated into a subsequent step (step 408) in the method 400.

At step 408, the method 400 assigns, to each pixel in each image, a spherical coordinate on a notional sphere 580 (FIG. 5). The term "spherical coordinate" denotes a complete identification of a unique position on the surface of a notional sphere 580 (FIG. 5) within the relevant reference frame, and may be, for example, a set of Cartesian (X, Y Z) coordinates or a set of polar (r, Θ) coordinates.

Referring now to FIG. 5, the notional sphere 580 has a specific geometric relationship to the notional tetrahedron 582 and the image plane 584 of each image. As can be seen in FIG. 5, the surface of the notional sphere 580 intersects the vertices 588 of the notional tetrahedron 582, the notional sphere 580 is centred on the centroid 586 of the notional tetrahedron 582 and the image plane 584 of each image is substantially tangential to the notional sphere 580.

Assigning the spherical coordinates to the pixels (step 408) is carried out according to a cylindrical projection that is aligned with the image plane of the image whose pixels are being assigned. A cylindrical projection is a type of map projection, which is a mathematical function that maps a position on the surface of a sphere to a position on a plane. The Mercator Projection, used to map the spherical surface of the Earth onto a rectangular planar map, is a well-known example of a cylindrical projection. Cylindrical projections are typically expressed in a form that takes a position on a sphere surface, for example latitude and longitude, and returns (x, y) values for the corresponding planar position. However, the notional sphere 580 has an infinite number of points, whereas each image has a finite number of pixels. By reversing the relevant cylindrical projection, it is possible to determine, for a given planar coordinate, the position on the sphere that would be mapped to that planar coordinate according to that cylindrical projection.

Figure 6A:
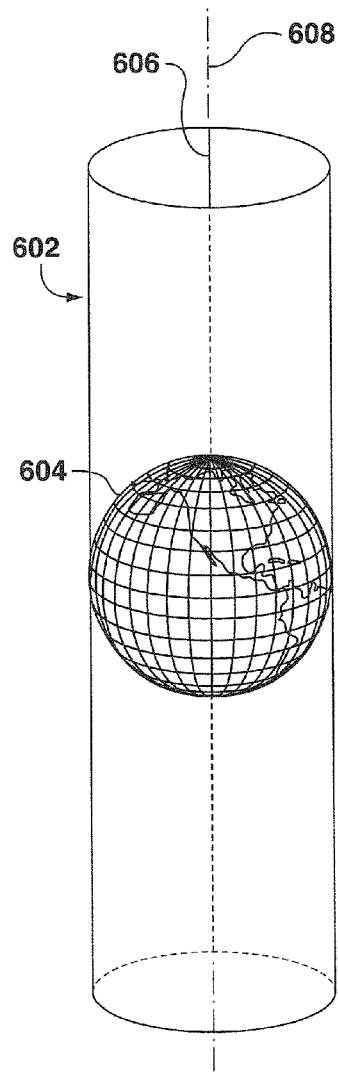
FIGS. 6A and 6B show application of an exemplary cylindrical projection to the Earth.
Figure 6B:
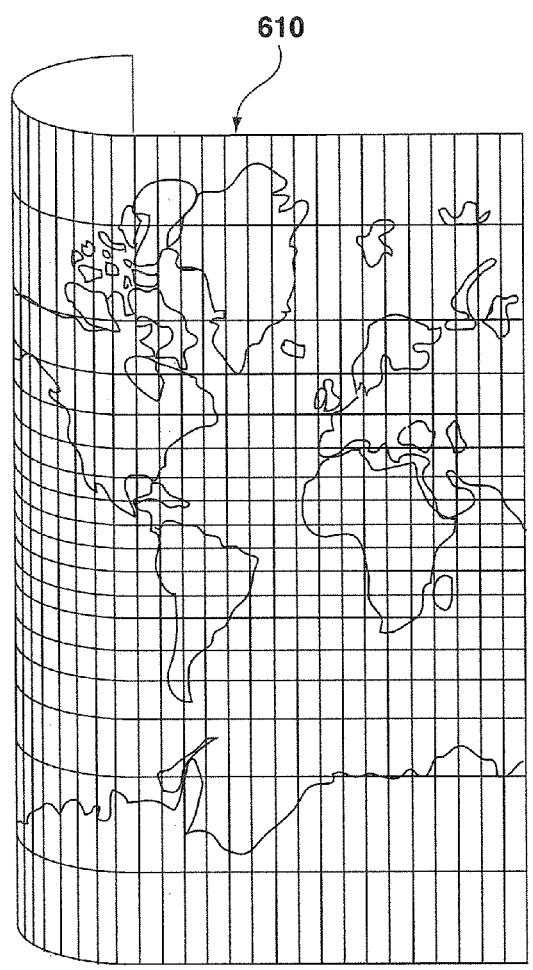

Reference is now made to FIGS. 6A and 6B, which show application of an exemplary cylindrical projection to the Earth. In overview, to obtain a cylindrical projection a notional hollow cylinder 602 is arranged substantially tangentially to the sphere 604, in this case the Earth, that is to be mapped (FIG. 6A). Points on the sphere 604 are then projected onto the notional cylinder 602 according to the formula for the particular cylindrical projection being used, and the notional cylinder 602 is then notionally "sliced" along a notional line 606 parallel to its longitudinal axis 608 and notionally "unrolled" into a plane 610 (FIG. 6B). The orientation of the notional cylinder relative to the sphere will affect how the points on the sphere are mapped to points on the notional cylinder and hence to points on the plane of the "unrolled" notional cylinder. Varying the orientation of the notional cylinder relative to the sphere will cause the same point on the sphere to be mapped to different positions on the plane.

Assignment of the spherical coordinates to the pixels of a particular image is carried out according to a cylindrical projection that is aligned with the image plane of that image—in other words, the notional cylinder of the cylindrical projection is oriented relative to the notional sphere 580 to match the orientation of the respective image plane 584 relative to the notional sphere 580. This orientation is illustrated geometrically in FIG. 7.

Figure 7:
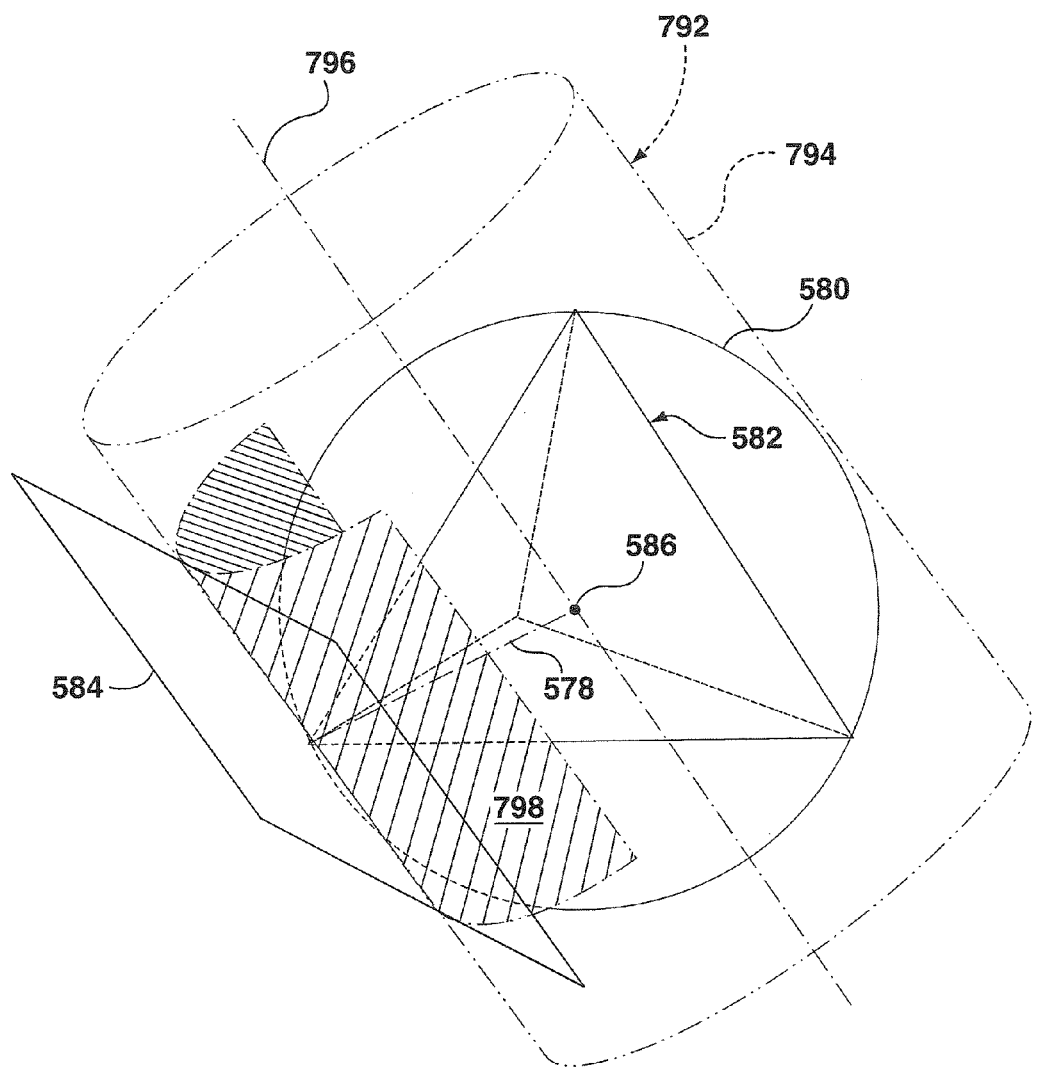
FIG. 7 shows alignment of a cylindrical projection with an image plane.

As noted above, the image plane 584 of each image is substantially tangential to the notional sphere 580 and substantially normal to the median 578 of the notional tetrahedron 582 for its respective vertex 588. One such image plane 584 is shown in FIG. 7. As shown in FIG. 7, the cylindrical projection is aligned with the image plane 584 when the notional cylinder 792 is oriented so that its cylinder wall 794 is substantially tangential to the image plane 584 and the longitudinal axis 796 of the notional cylinder 792 intersects the centroid 586 of the notional tetrahedron 582, which is also the center of the notional sphere 580.

When the cylindrical projection is so aligned, there is a direct correspondence, without distortion, between positions on the image plane 584 and positions on the cylinder wall 794. The image plane 584 can be treated mathematically as if it were a part 798 of the cylinder wall 794, denoted by hatching in FIG. 7, that has been "unrolled" from around the notional sphere 580. By treating the image plane 584 as if it were part 798 of the cylinder wall 794, the correspondence between planar positions on the image plane 584 and spherical positions on the notional sphere 580 can be determined according to the formula for the cylindrical projection. Since each pixel in the image corresponds to a position on the respective image plane 584, the spherical coordinates can then be assigned to the pixels in that image.

It should be noted here that as long as the notional cylinder 792 is oriented so that its cylinder wall 794 is substantially tangential to the image plane 584 and the longitudinal axis 796 of the notional cylinder 792 intersects the centroid 586 of the notional tetrahedron 582 (and therefore also intersects the center of the notional sphere 580), the pivotal position of the notional cylinder 792, relative to an axis normal to the image plane 584, is immaterial.

Figure 8A:
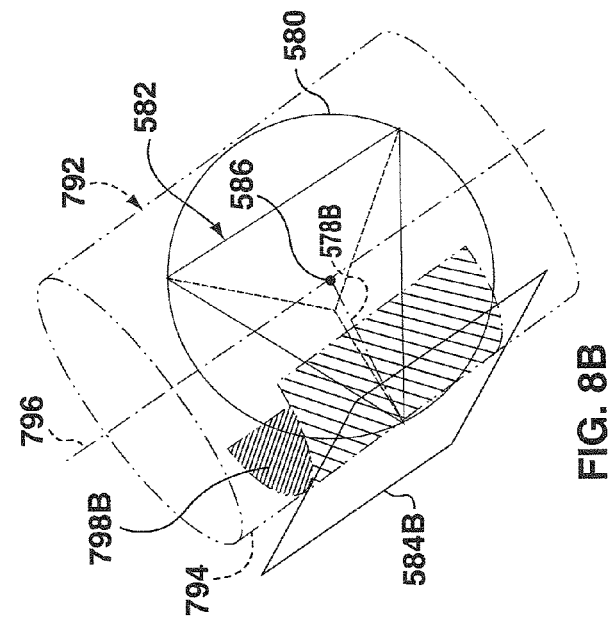
FIGS. 8A to 8D show exemplary orientations of the notional cylinder of a cylindrical projection in which the cylindrical projection is aligned with each image plane in the geometric arrangement shown in FIG. 5.
Figure 8B:
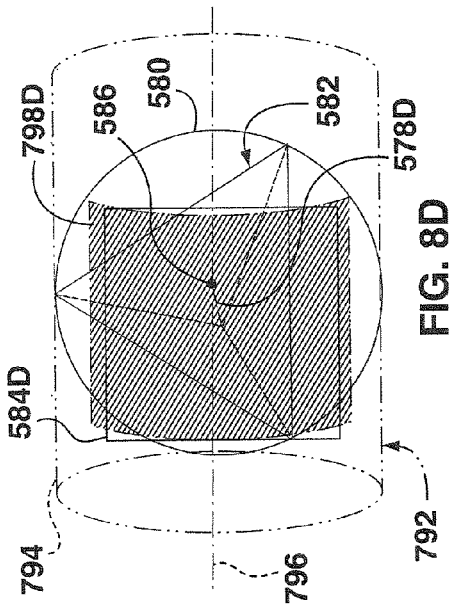
Figure 8C:
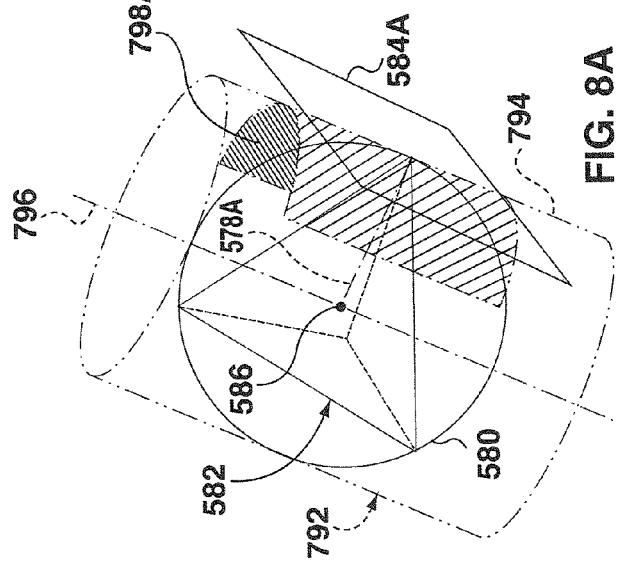
Figure 8D:
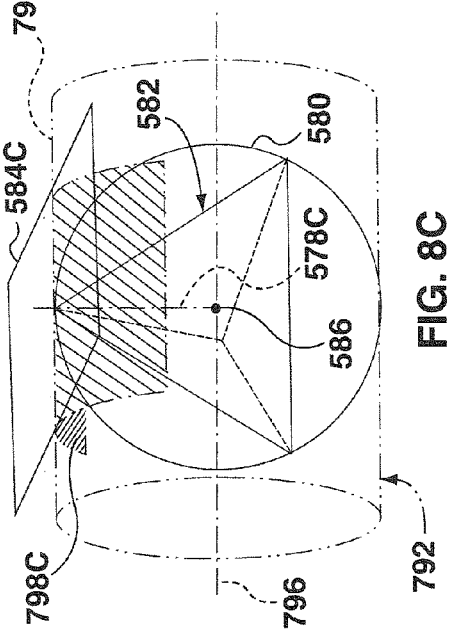

Reference is now made to FIGS. 8A to 8D, which show exemplary orientations of the notional cylinder 792 in which the cylindrical projection is aligned with each image plane 584A, 584B, 584C and 584D. The medians are denoted by respective reference numerals 578A, 578B, 578C and 578D. The orientation of each of the notional sphere 580, notional tetrahedron 582 and image planes 584A, 584B, 584C, 584D is held constant throughout FIGS. 8A to 8D to show the different orientations of the notional cylinder 792 that align the cylindrical projection with each respective image plane 584A, 584B, 584C and 584D. FIG. 8A shows the notional cylinder 792 oriented to align the cylindrical projection with a first image plane 584A, FIG. 8B shows the notional cylinder 792 oriented to align the cylindrical projection with a second image plane 584B, FIG. 8C shows the notional cylinder 792 oriented to align the cylindrical projection with a third image plane 584C and FIG. 8D shows the notional cylinder 792 oriented to align the cylindrical projection with a fourth image plane 584D. In each case, the respective image plane 584A, 584B, 584C, 584D can be treated mathematically as if it were a part 798A, 798B, 798C, 798D of the cylinder wall 794, denoted by hatching in FIGS. 8A to 8D, that has been "unrolled" from around the notional sphere 580, thereby enabling the spherical coordinates to be assigned to the pixels in the respective image. By assigning the spherical coordinates to the pixels in each image according to a cylindrical projection that is individually aligned with the image plane for that specific image, a good fit is achieved between the images and the notional sphere.

As noted above, each of the four images received at step 402 of the method 400 (FIG. 4) may be images captured by the image sensors 104A, 104B, 104C, 104D of a tetrahedral imaging system as described above. FIGS. 9A, 9B, 9C and 9D show the exemplary physical embodiment 200 of the tetrahedral imaging system, with its orientation held constant, to show the arrangement of the image planes 584A, 584B, 584C, 584D relative thereto and to show the different orientations of the notional cylinder 792 that align the cylindrical projection with each respective image plane 584A, 584B, 584C and 584D to enable the spherical coordinates to be assigned to the pixels as described above.

Referring again to FIG. 4, in a preferred embodiment, at step 408 the spherical coordinates are assigned to the respective pixels according to a precalculated lookup table derived from the cylindrical projection. The size, position and orientation of the image planes 584 relative to one another and to the notional sphere 580 are known and consistent, and hence the spatial relationship of each pixel to the notional sphere 580 is also known and consistent. Accordingly, the spherical coordinate representing the projection of each pixel from its respective image plane 584 onto the surface of the notional sphere 580 can be calculated in advance and stored in a lookup table, rather than being calculated each time an image is processed.

In a particularly preferred embodiment, the spherical coordinates in the precalculated lookup table used at step 408 include position adjustments for distortion correction in addition to being derived from the cylindrical projection. Thus, for any given pixel, the associated spherical coordinates in the lookup table would represent the projection from the image plane 584 onto the surface of a notional sphere 580 of the distortion-corrected pixel position for that pixel.

In a particularly preferred embodiment, the cylindrical projection according to which the spherical coordinates are assigned to the pixels is a Miller cylindrical projection. The inverse Miller projection, that is, the function that, for a given planar coordinate, gives the position on the sphere that would be mapped to that planar coordinate according to the Miller cylindrical projection, is given by:

$$\tan^{-1}(e^{4/5x}) - \pi/4$$

$$\lambda = y$$

where $\phi$ is latitude and $\lambda$ is longitude.

Latitude and longitude can be mapped to Cartesian coordinates, with the center of the notional sphere as the origin, via the following equations:

$$x = R^* \cos(\lambda) \cos(\phi)$$

$$y = R^* \cos(\lambda) \sin(\phi)$$

$$z = R^* \sin(\lambda)$$

Although preferred, the Miller cylindrical projection is merely one example of a cylindrical projection according to which spherical coordinates may be assigned to pixels at step 408. Other suitable cylindrical projections may also be used, including Mercator, Central Cylindrical, Gall Stereographic, Braun Stereographic, Equidistant and Equal Area projections. The formulas for these projections, and their inversions, are well known and are not repeated here.

Continuing to refer to FIG. 4, at step 410, the method 400 uses the spherical coordinates assigned at step 408 to assign colours to image spaces in a spherical image according to a spherical image template. The term "spherical image template", as used herein, refers to any pixel-based computer-usable image format in which each pixel position in the image corresponds uniquely with a position on the surface of a notional sphere according to a known mapping, and the term "spherical image" refers to a spherical image template whose pixel positions are populated, i.e. colours are assigned to the pixel positions. A suitably programmed computer, that is, a computer that has been programmed with suitable spherical viewing software, can use the unique correspondence between each pixel position and a position on the notional sphere to generate a three-dimensional model of a sphere whose surface pixels correspond to those of the spherical image. For example, a user may be presented with a model in which the user's perspective is either inside or outside of the notional sphere, and the user may be permitted to rotate his or her perspective relative to the sphere. The exemplary method 400 described herein is particularly adapted (although not limited) to using images of the "real world" captured by a tetrahedral imaging system to generate spherical images. These spherical images can then be used to generate immersive environments simulating the "real world" in which the user's perspective is from inside the notional sphere.

Preferably, the spherical image template according to which colours are assigned at step 408 is an equirectangular image template, since the equirectangular projection has a simple relationship between pixel position and the position on the surface of the notional sphere. However, other types of spherical image template may also be used.

Generally, assigning the spherical coordinates to each pixel in each image results in both unique pixels and pixel groups. As used herein, the term "unique pixel" refers to a pixel that has been assigned a unique spherical coordinate, that is, a spherical coordinate that has not been assigned to any other pixel. The term "pixel group", as used herein, refers to a plurality of pixels whose spherical coordinates are identical, that is, a set of pixels each having been assigned the same spherical coordinate. Where the fields of view of the image sensors are substantially coterminous, there will be very few pixel groups; the number of pixel groups will increase as the degree of overlap between the fields of view of the image sensors increases.

Figure 10:
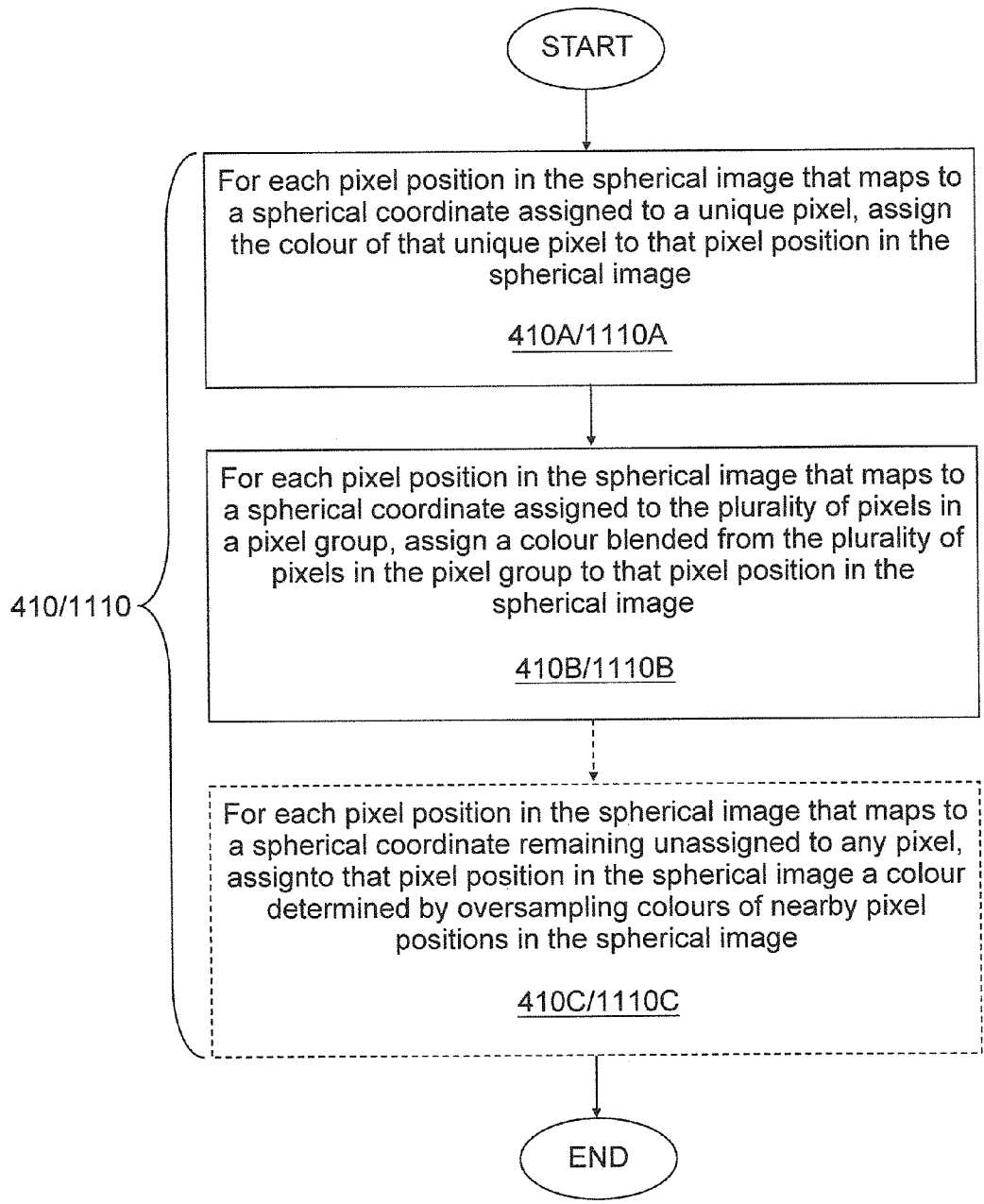
FIG. 10 is a flow chart showing an exemplary method for assigning colours to image spaces in a spherical image according to a spherical image template.

Referring now to FIG. 10, in the case where there are both unique pixels and pixel groups, the step of using the spherical coordinates to assign colours to the pixel positions in the spherical image according to a spherical image template (step 410) may comprise a plurality of substeps. At substep 410A, for each pixel position in the spherical image that maps to a spherical coordinate assigned to a unique pixel, the colour of that unique pixel is assigned to that pixel position in the spherical image, and at substep 410B, for each pixel position in the spherical image that maps to a spherical coordinate assigned to the plurality of pixels in a pixel group, a colour blended from the plurality of pixels in the pixel group is assigned to that pixel position in the spherical image. Any suitable blending algorithm now known or hereafter developed may be used for this process.

In addition, there will often be instances in which there are one or more spherical coordinates that remaining unassigned to any pixel. To avoid empty spaces (i.e. blank pixels) in the resulting spherical image, step 410 may include a further optional substep 410C of assigning, to each pixel position in the spherical image that maps to a spherical coordinate remaining unassigned to any pixel, a colour determined by oversampling colours of nearby pixel positions in the spherical image template. Steps 410A and 410B may be carried out in any order, or substantially simultaneously, while step 410C should be carried out after steps 410A and 410B so that the pixel positions (other than those to which colours are assigned at substep 410C) already have colours assigned to support the oversampling. Any suitable oversampling algorithm now known or hereafter developed may be used for this process; for example, substep 410C may comprise bilinear interpolation based on the four closest pixel positions in the spherical image template to the pixel position in the spherical image template to which a colour is being assigned.

The method 400 shown in FIG. 4 is a particular instance of a more general method for generating a spherical image. This more general method is indicated by reference numeral 1100 and shown in FIG. 11. As noted above, the method 400 uses images representing outward-looking views from the vertices of a notional tetrahedron. A tetrahedron is an instance of a Platonic solid, which is a regular, convex polyhedron whose faces are formed by congruent, regular polygons in which the same number of faces meet at each vertex. The other Platonic solids are the cube or hexahedron, shown in FIG. 12A, the octahedron (eight equilateral triangular faces), shown in FIG. 12B, the dodecahedron (twelve regular pentagonal faces), shown in FIG. 12C, and the icosahedron (twenty equilateral triangular faces), shown in FIG. 12D. While the tetrahedron is the preferred Platonic solid for the method 1100 because it has the fewest vertices and fewest faces and therefore the smallest number of image sensors are required for a corresponding imaging system, the method 1100 may be used with any set of images representing outward-looking views from each member of a set of surrounding points of a notional Platonic solid.

As used herein, the tem "surrounding point", when used in reference to a Platonic solid, means the vertices of the Platonic solid and the centroids of the faces of the Platonic solid. Thus, there are two distinct sets of surrounding points: the set consisting of all vertices of the Platonic solid and the set consisting of the centroids of each of the faces of the Platonic solid. The term "surrounding point" is used because each point in each set is surrounded by points in the other set. In particular, each vertex is surrounded by the centroids of the adjacent faces forming that vertex, and the centroid of each face is surrounded by the vertices defining the boundaries of that face.

Figure 11:
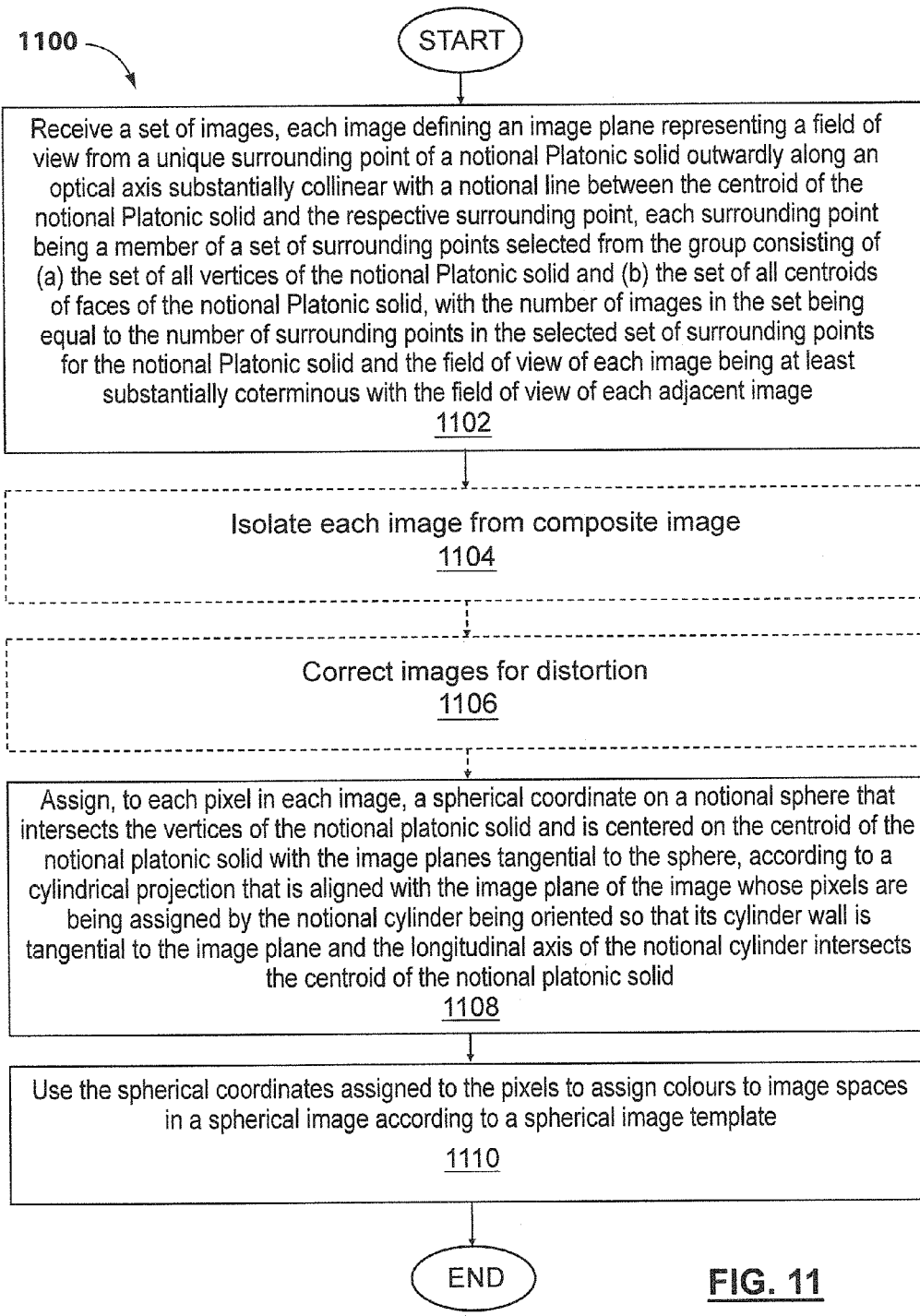
FIG. 11 is a flow chart showing an exemplary method for generating a spherical image based on Platonic solid geometry.
Figure 12B:
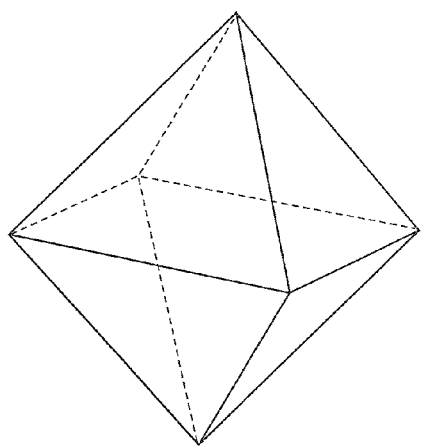
FIG. 12B shows an octahedron.
Figure 12D:
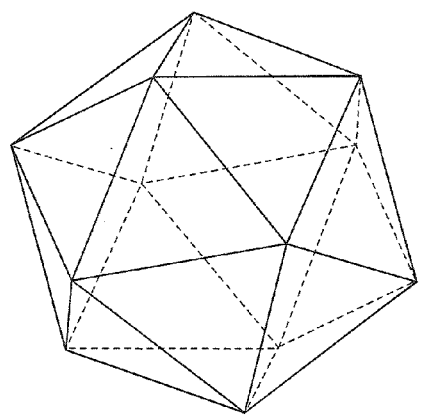
FIG. 12D shows an icosahedron.
Figure 12A:
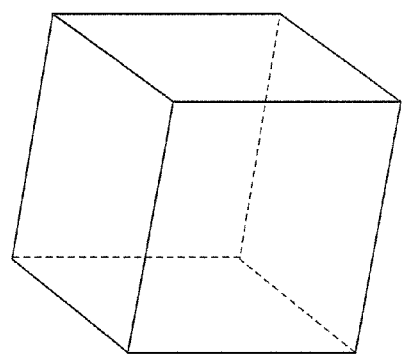
FIG. 12A shows a cube.
Figure 12C:
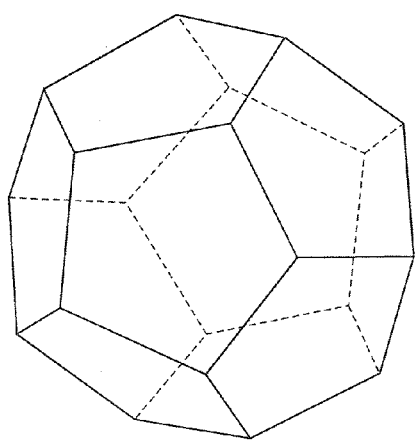
FIG. 12C shows a dodecahedron.

Reference is now made specifically to FIG. 11, and the exemplary method 1100 for generating a spherical image, such as an equirectangular image, is now described. At step 1102, the method 1100 receives a set of images. Optionally, the images received at step 1102 may be multiplexed into a composite image, in which case the method 1100 will include an optional step 1104 of isolating each image from the composite image. As with the method 400, the isolation step 1104 does not require that the composite image actually be decomposed, and the isolating step 1104 may consist of identifying the individual images based on known boundaries in the composite image.

Each image received at step 1102 defines an image plane representing a field of view from a unique surrounding point of a notional Platonic solid, outwardly along an optical axis substantially collinear with a notional line between the centroid of the notional Platonic solid and the respective surrounding point. Thus, where the surrounding points are the centroids of the faces, each optical axis will be substantially perpendicular to the respective face. Each surrounding point for which an associated image is received at step 1102 is a member of a set of surrounding points selected from the group consisting of (a) the set of all vertices of the notional Platonic solid and (b) the set of all centroids of faces of the notional Platonic solid. The number of images in the set of images received at step 1102 is equal to the number of surrounding points in the selected set of surrounding points for the notional Platonic solid, with one image corresponding to each surrounding point in the selected set. Where the selected set of surrounding points is the set of all vertices of the notional Platonic solid, each image received at step 1102 defines an image plane representing a field of view from a unique vertex of the notional Platonic solid, with the number of images in the set equal to the number of vertices. Where the selected set of surrounding points is the set of all centroids of faces of the notional Platonic solid, each image received at step 1102 defines an image plane representing a field of view from the centroid of a unique face of the notional Platonic solid, with the number of images in the set equal to the number of faces in the notional Platonic solid, with one image corresponding to each face.

The field of view of each image is at least substantially coterminous with the field of view of each adjacent image, and preferably overlaps the field of view of each adjacent image. Similarly to the exemplary method 400, each image in the set of images received at step 1102 may be one image in a video stream comprising a plurality of images and, by repeated application to sets of images where each image is one image in a video stream, the method 1100 may be used to generate spherical video.

Figure 13A:
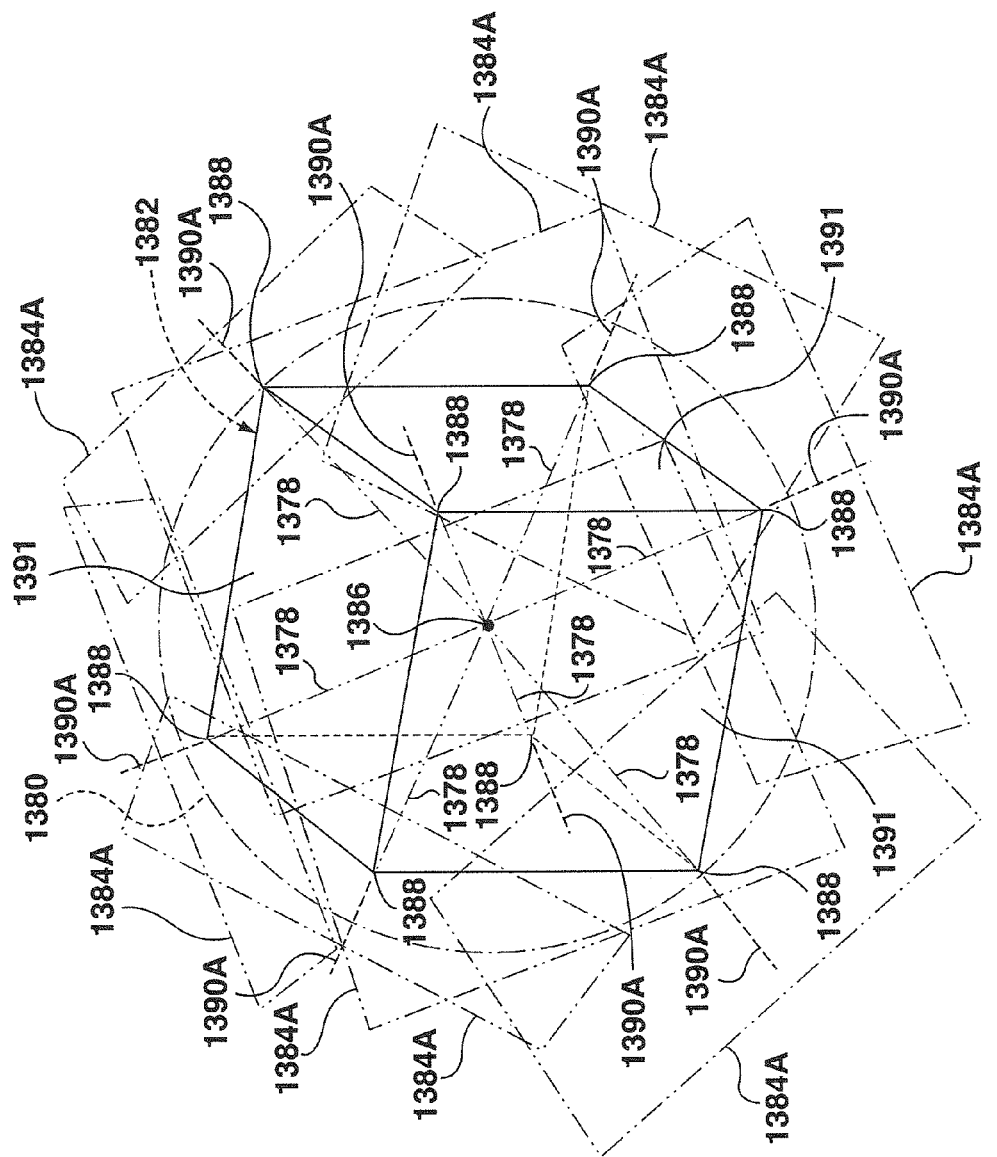
FIG. 13A shows a geometric arrangement of image planes for images to be used to generate a spherical image according to the method of FIG. 11 where the notional Platonic solid is a notional cube and the surrounding points are the vertices of the notional cube.

FIGS. 13A and 13C each show exemplary geometry where the notional Platonic solid is a cube.

Geometry for the case where the notional Platonic solid is a notional cube 1382 and the selected set of surrounding points is the set of all vertices 1388 of the notional cube 1382 is shown in FIG. 13A. In this case, a set of eight images is received at step 1102, and each of these images defines an image plane 1384A representing a field of view from a unique vertex 1388 of the notional cube 1382 outwardly along an optical axis 1390A substantially collinear with a notional line 1378 between the centroid 1386 of the notional cube 1382 and the respective vertex 1388. Thus, each image plane 1384A is substantially normal to the notional line 1378 between the centroid 1386 of the notional cube 1382 and the respective vertex 1388. Also shown in FIG. 13A is a notional sphere 1380, which may be used at step 1108 described below, and whose surface intersects the vertices 1388 of the notional cube 1382 and which is centred on the centroid 1386 of the notional cube 1382. The image plane 1384A of each image is substantially tangential to the notional sphere 1380.

FIG. 13C shows geometry for the case where the notional Platonic solid is a notional cube 1382 and the selected set of surrounding points is the set of all centroids 1389 of faces 1391 of the notional cube 1382. A set of six images is received at step 1102, and each of these images defines an image plane 1384C representing a field of view from the centroid 1389 of a unique face 1391 of the notional cube 1382 outwardly along an optical axis 1390C substantially collinear with a notional line 1379 between the centroid 1386 of the notional cube 1382 and the centroid 1389 of the respective face 1391. Thus, the image plane 1384C is substantially normal to the notional line 1379 between the centroid 1386 of the notional cube 1382 and the centroid 1389 of the respective face 1391. Also shown in FIG. 13C is a notional sphere 1380, which may be used at step 1108 described below, whose surface intersects the vertices 1388 of the notional cube 1382 and which is centred on the centroid 1386 of the notional cube 1382. The image plane 1384C of each image is substantially tangential to the notional sphere 1380.

Figure 14A:
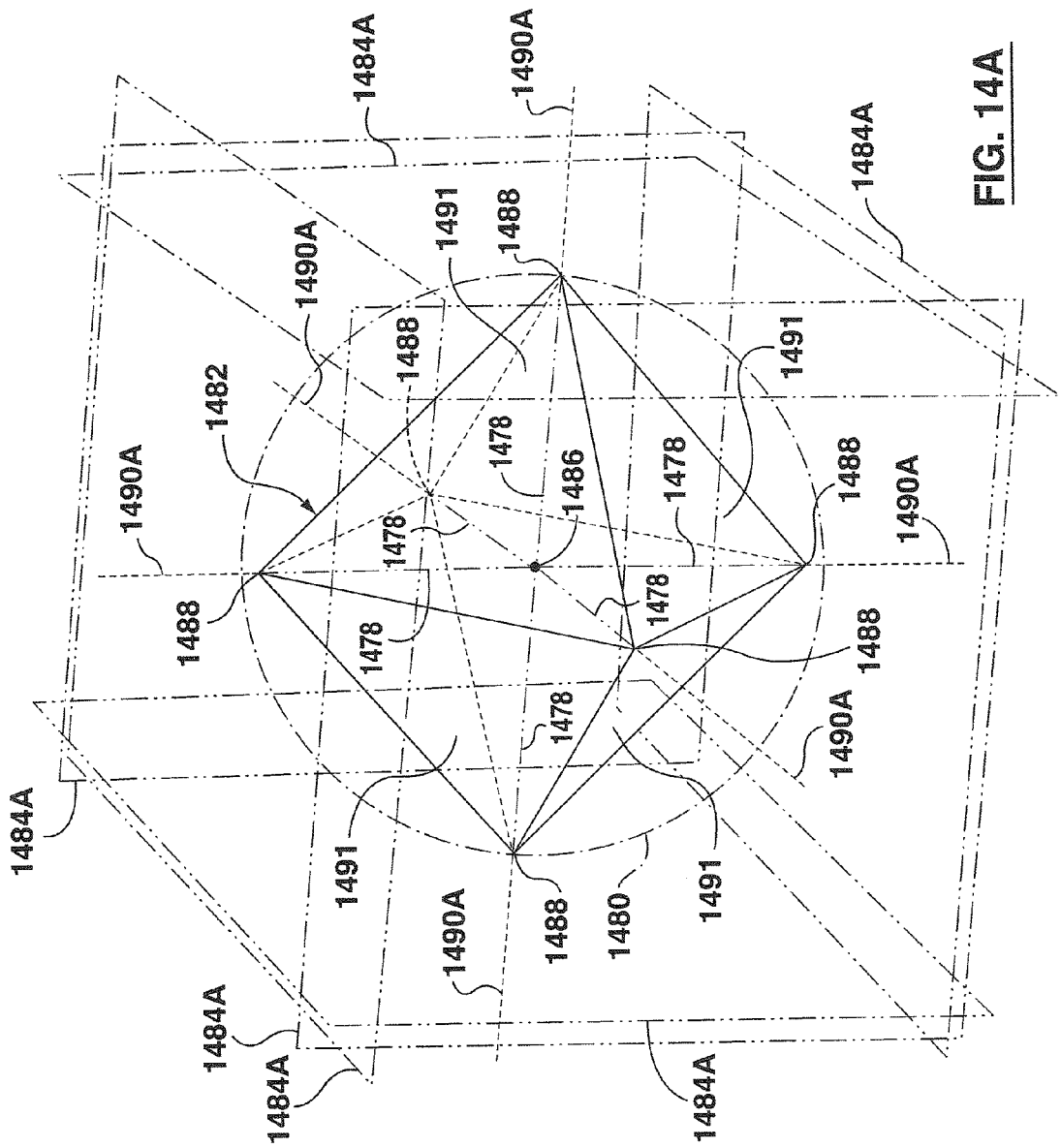
FIG. 14A shows a geometric arrangement of image planes for images to be used to generate a spherical image according to the method of FIG. 11 where the notional Platonic solid is a notional octahedron and the surrounding points are the vertices of the notional octahedron.
Figure 14B:
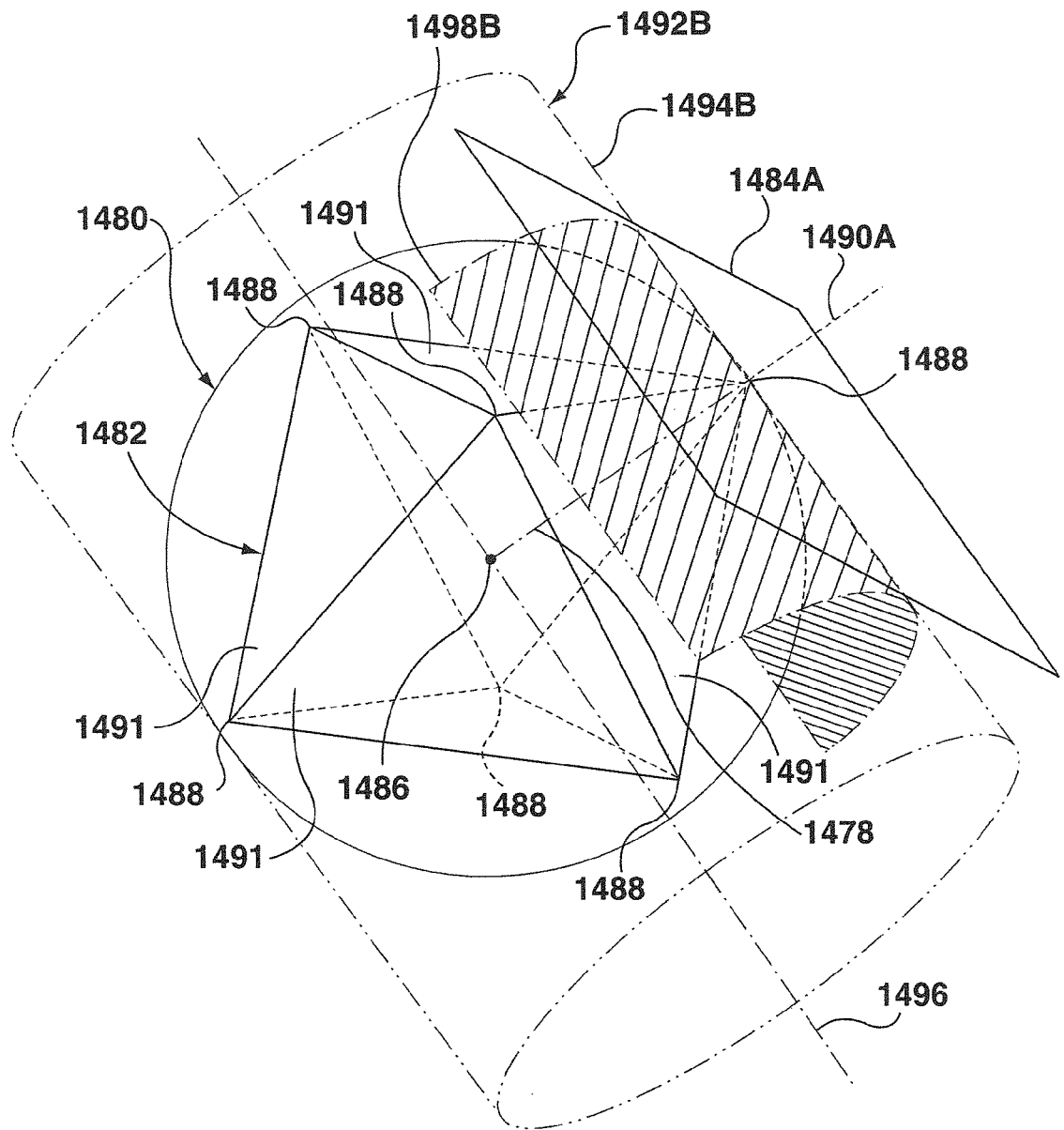
FIG. 14B shows an exemplary orientation of the notional cylinder of a cylindrical projection in which the cylindrical projection is aligned with an image plane in the geometric arrangement shown in FIG. 14A.
Figure 14C:
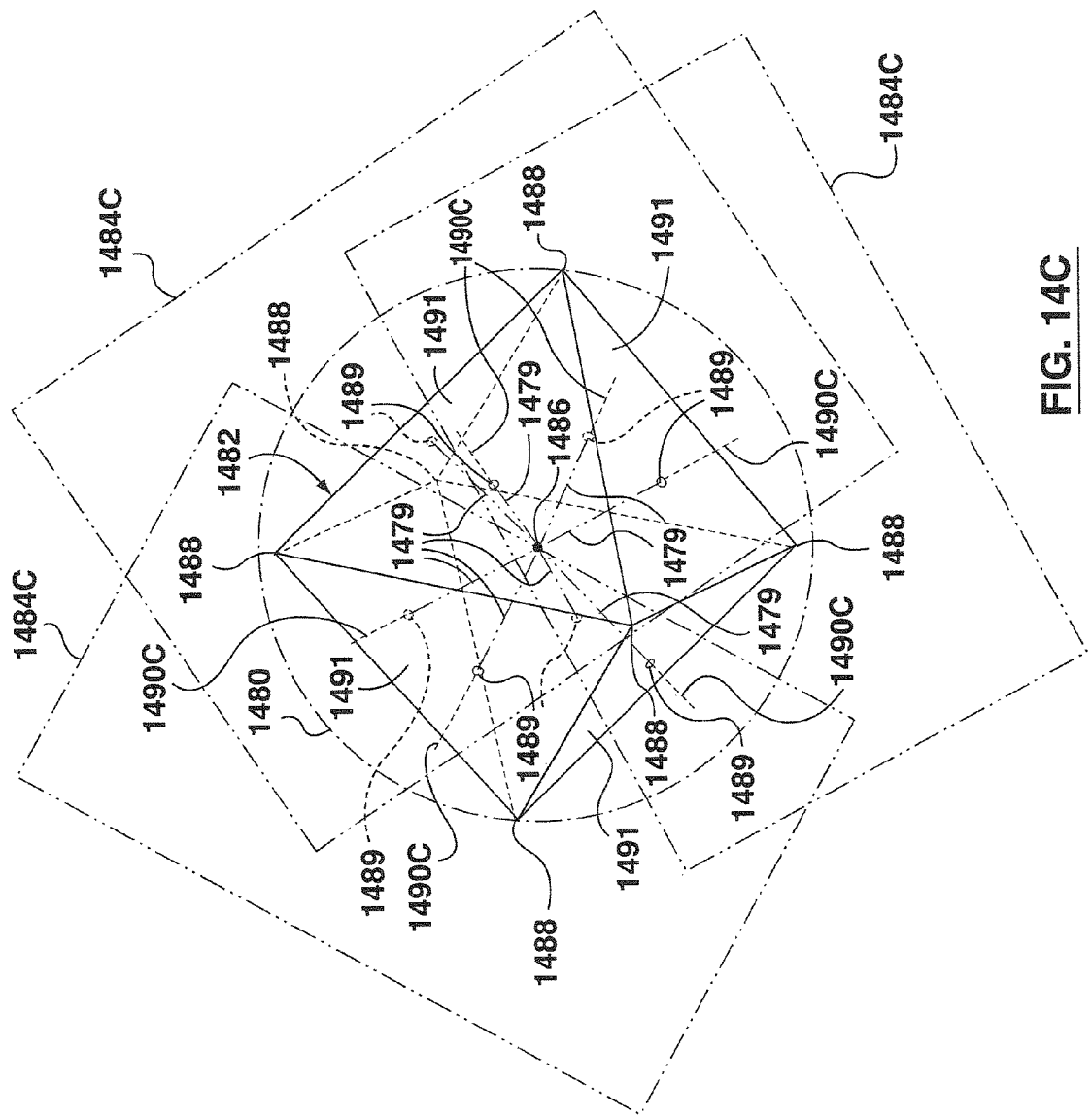
FIG. 14C shows a geometric arrangement of image planes for images to be used to generate a spherical image according to the method of FIG. 11 where the notional Platonic solid is a notional octahedron and the surrounding points are centroids of the faces of the notional octahedron.

FIGS. 14A and 14C show geometry where the notional Platonic solid is an octahedron.

Geometry for the case where the notional Platonic solid is a notional octahedron 1482 and the selected set of surrounding points is the set of all vertices 1488 of the notional octahedron 1482 is shown in FIG. 14A. For such an embodiment, a set of six images is received at step 1102. Each of the six images defines an image plane 1484A that represents a field of view from a unique vertex 1488 of the notional octahedron 1482 outwardly along an optical axis 1490A substantially collinear with a notional line 1478 between the centroid 1486 of the notional octahedron 1482 and the respective vertex 1488. Each image plane 1484A is substantially normal to the notional line 1478 between the centroid 1486 of the notional octahedron 1482 and the respective vertex 1488. FIG. 14A also shows a notional sphere 1480 whose surface intersects the vertices 1488 of the notional octahedron 1482 and which is centred on the centroid 1486 of the notional octahedron 1482, with the image plane 1484A of each image substantially tangential to the notional sphere 1480. The notional sphere 1480 may be used at step 1108, described below.

FIG. 14C shows geometry for the case where the notional Platonic solid is a notional octahedron 1482 and the selected set of surrounding points is the set of all centroids 1489 of faces 1491 of the notional octahedron 1482. For such an embodiment, a set of eight images is received at step 1102. Each of the eight images defines an image plane 1484C that represents a field of view from the centroid 1489 of a unique face 1491 of the notional octahedron 1482, outwardly along an optical axis 1490C. The optical axis 1490C is substantially collinear with a notional line 1479 between the centroid 1486 of the notional octahedron 1482 and the centroid 1489 of the respective face 1491. The image plane 1484C is substantially normal to the notional line 1479 between the centroid 1486 of the notional octahedron 1482 and the centroid 1489 of the respective face 1491. FIG. 14C also shows a notional sphere 1480 whose surface intersects the vertices 1488 of the notional octahedron 1482 and which is centred on the centroid 1486 of the notional octahedron 1482, with the image plane 1484C of each image substantially tangential to the notional sphere 1480. The notional sphere 1480 may be used at step 1108, described below.

Figure 15A:
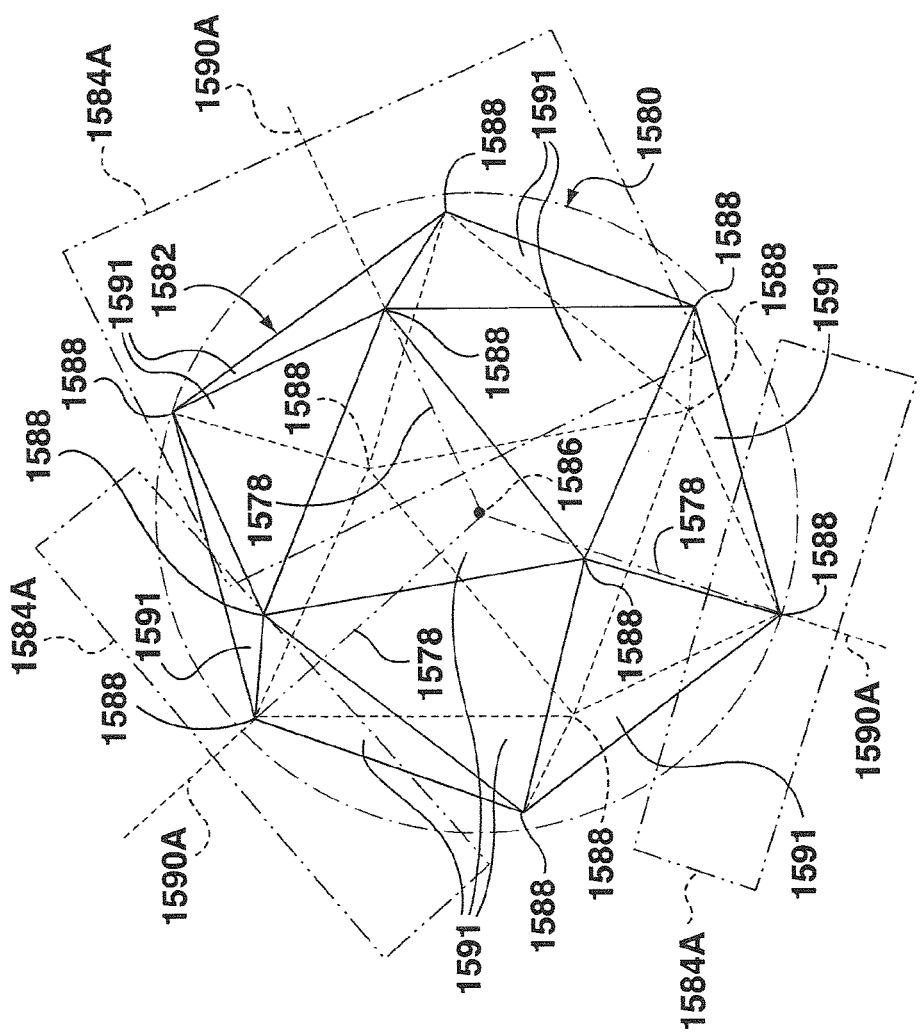
FIG. 15A shows a geometric arrangement of image planes for images to be used to generate a spherical image according to the method of FIG. 11 where the notional Platonic solid is a notional icosahedron and the surrounding points are the vertices of the notional icosahedron.
Figure 15B:
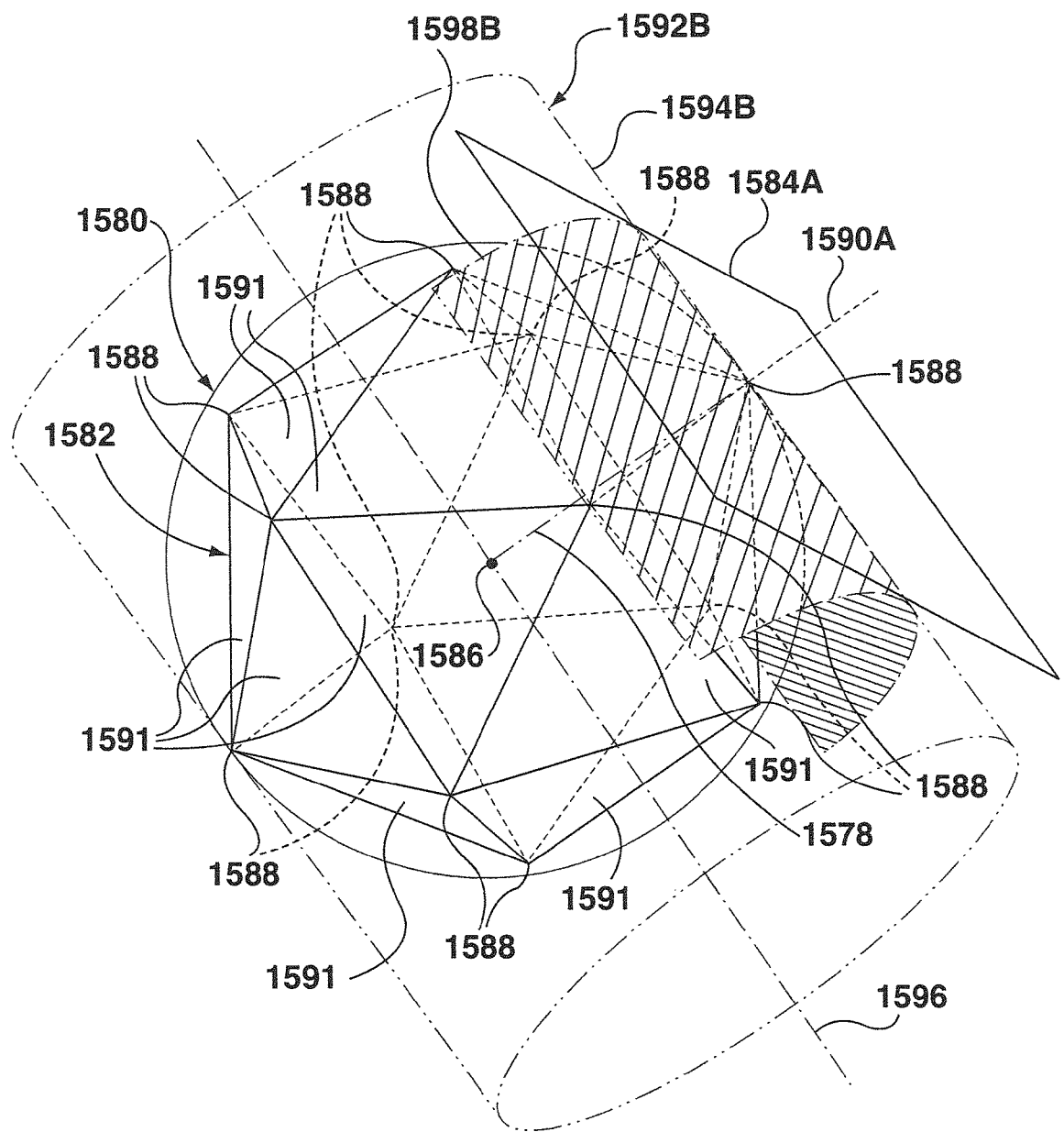
FIG. 15B shows an exemplary orientation of the notional cylinder of a cylindrical projection in which the cylindrical projection is aligned with an image plane in the geometric arrangement shown in FIG. 15A.
Figure 15C:
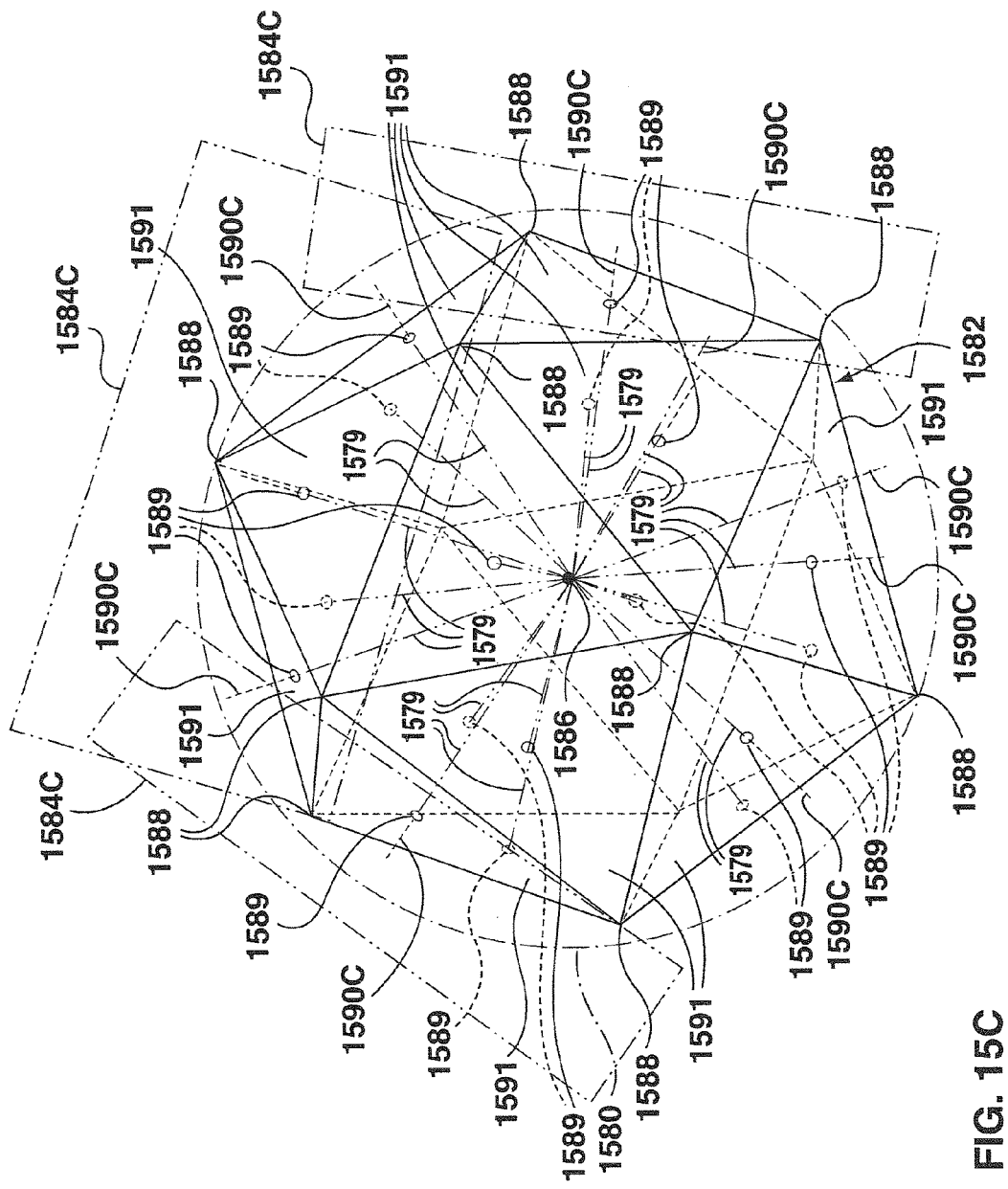
FIG. 15C shows a geometric arrangement of image planes for images to be used to generate a spherical image according to the method of FIG. 11 where the notional Platonic solid is a notional icosahedron and the surrounding points are centroids of the faces of the notional icosahedron.

FIGS. 15A and 15C show geometry where the notional Platonic solid is an icosahedron.

Reference is now made to FIG. 15A, which shows geometry for the case where the notional Platonic solid is a notional icosahedron 1582 and the selected set of surrounding points is the set of all vertices 1588 of the notional icosahedron 1582. For an icosahedron as the notional Platonic solid with the surrounding points being the vertices 1588, a set of twelve images is received at step 1102, each of which defines an image plane 1584A representing an outward field of view from a unique vertex 1588 of the notional icosahedron 1582 along an optical axis 1590A substantially collinear with a notional line 1578 between the centroid 1586 of the notional icosahedron 1582 and the respective vertex 1588. For ease of illustration, only a representative set of image planes 1584A, optical axes 1590A and notional lines 1578 are shown. With this arrangement, the image plane 1584A is substantially normal to the notional line 1578 between the centroid 1586 of the notional icosahedron 1582 and the respective vertex 1588. In addition, FIG. 15A shows a notional sphere 1580, which may be used in step 1108 as described below. The surface of the notional sphere 1580 intersects the vertices 1588 of the notional icosahedron 1582, and the notional sphere 1580 is centred on the centroid 1586 of the notional icosahedron

1582. The image plane 1584A of each image is substantially tangential to the notional sphere 1580.

FIG. 15C shows geometry for the case where the notional Platonic solid is a notional icosahedron 1582 and the selected set of surrounding points is the set of all centroids 1589 of faces 1591 of the notional icosahedron 1582. In this embodiment, a set of twenty images is received at step 1102, each of which defines an image plane 1584C representing an outward field of view from centroid 1589 of a unique face 1591 of the notional icosahedron 1582 along an optical axis 1590C substantially collinear with a notional line 1579 between the centroid 1586 of the notional icosahedron 1582 and the centroid 1589 of the respective face 1591. As in FIG. 15A, for ease of illustration, only a representative set of image planes 1584C, optical axes 1590C and notional lines 1579 are shown. With this arrangement, the image plane 1584C is substantially normal to the notional line 1579 between the centroid 1586 of the notional icosahedron 1582 and the centroid 1589 of the respective face 1591. In addition, FIG. 15C shows the notional sphere 1580, which may be used in step 1108 as described below. The surface of the notional sphere 1580 intersects the vertices 1588 of the notional icosahedron 1582, and the notional sphere 1580 is centred on the centroid 1586 of the notional icosahedron 1582. The image plane 1584C of each image is substantially tangential to the notional sphere 1580.

Figure 16A:
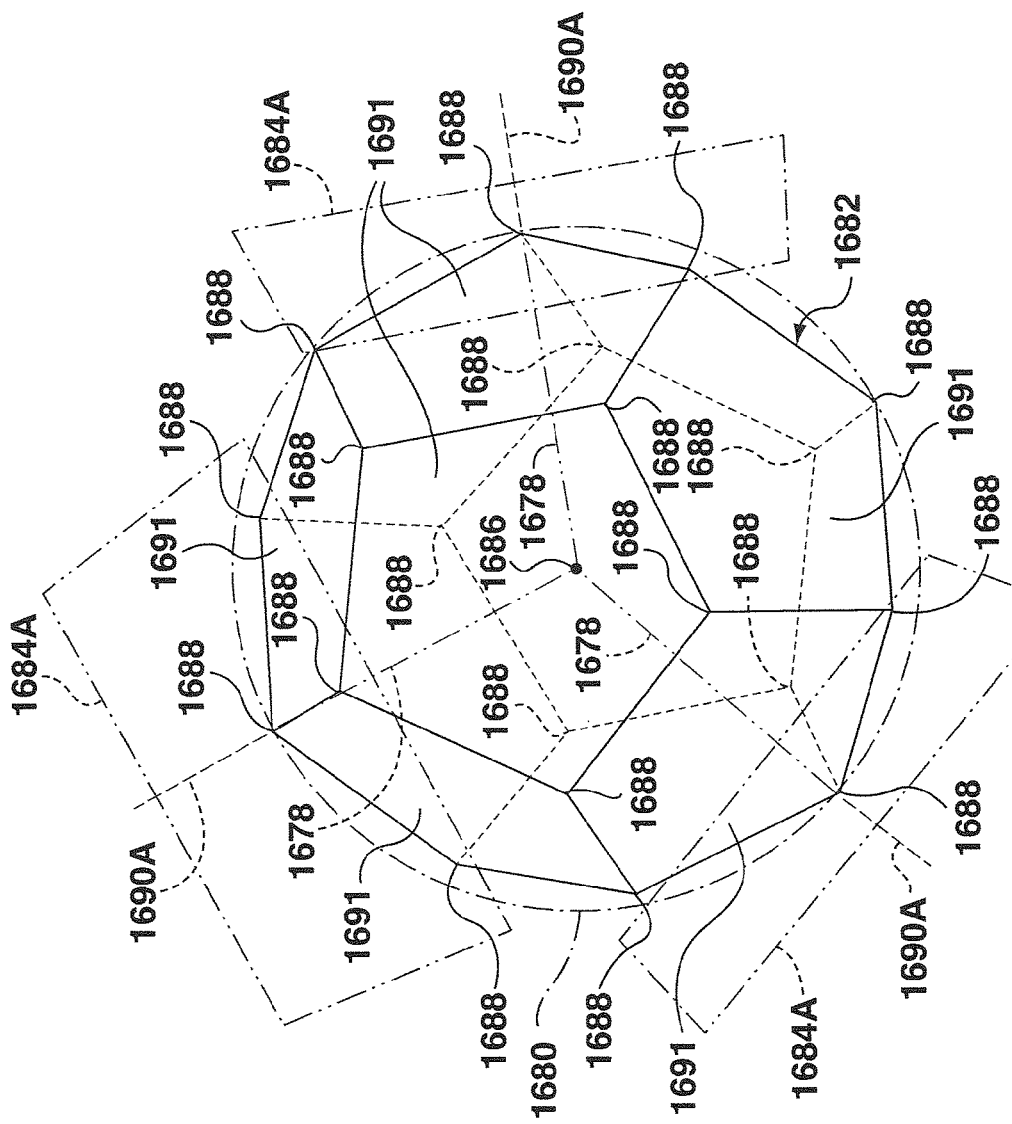
FIG. 16A shows a geometric arrangement of image planes for images to be used to generate a spherical image according to the method of FIG. 11 where the notional Platonic solid is a notional dodecahedron and the surrounding points are the vertices of the notional dodecahedron.
Figure 16B:
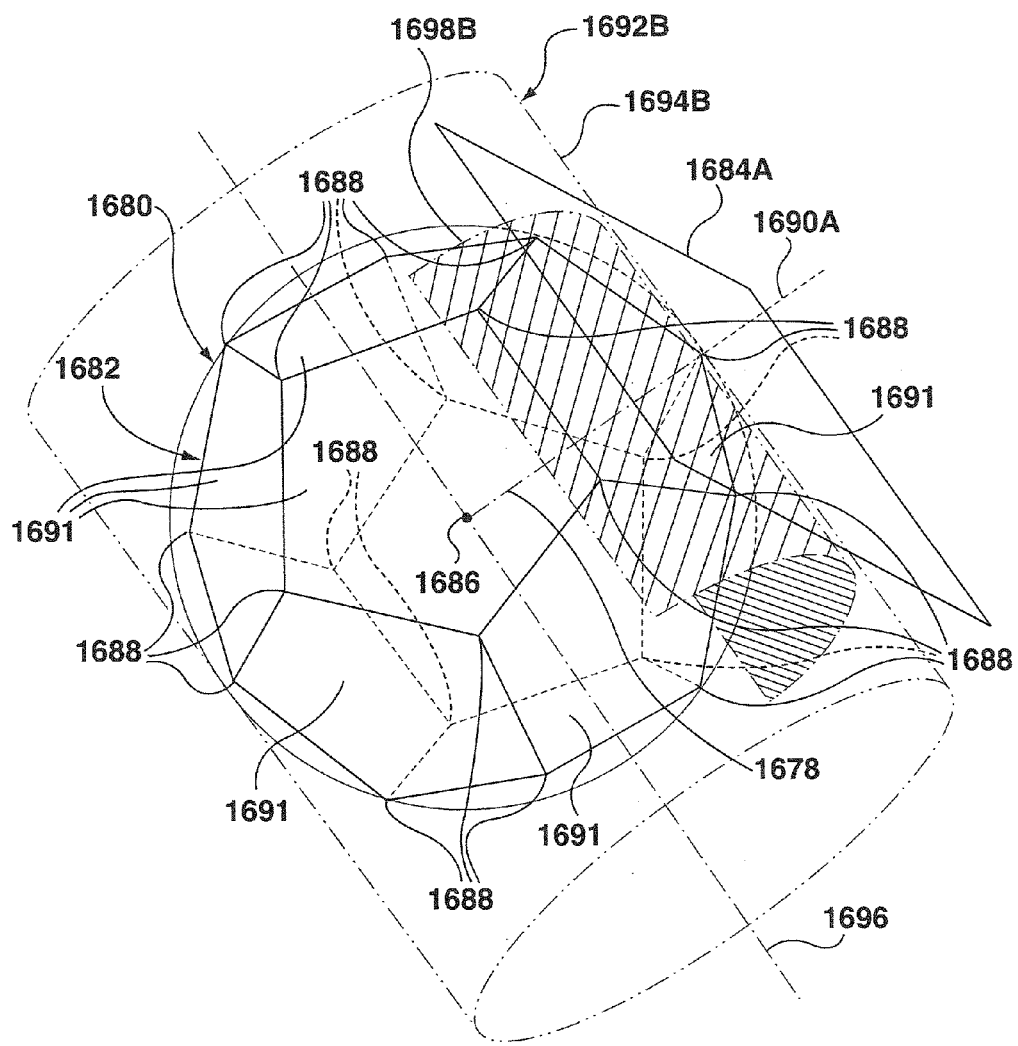
FIG. 16B shows an exemplary orientation of the notional cylinder of a cylindrical projection in which the cylindrical projection is aligned with an image plane in the geometric arrangement shown in FIG. 16A.
Figure 16C:
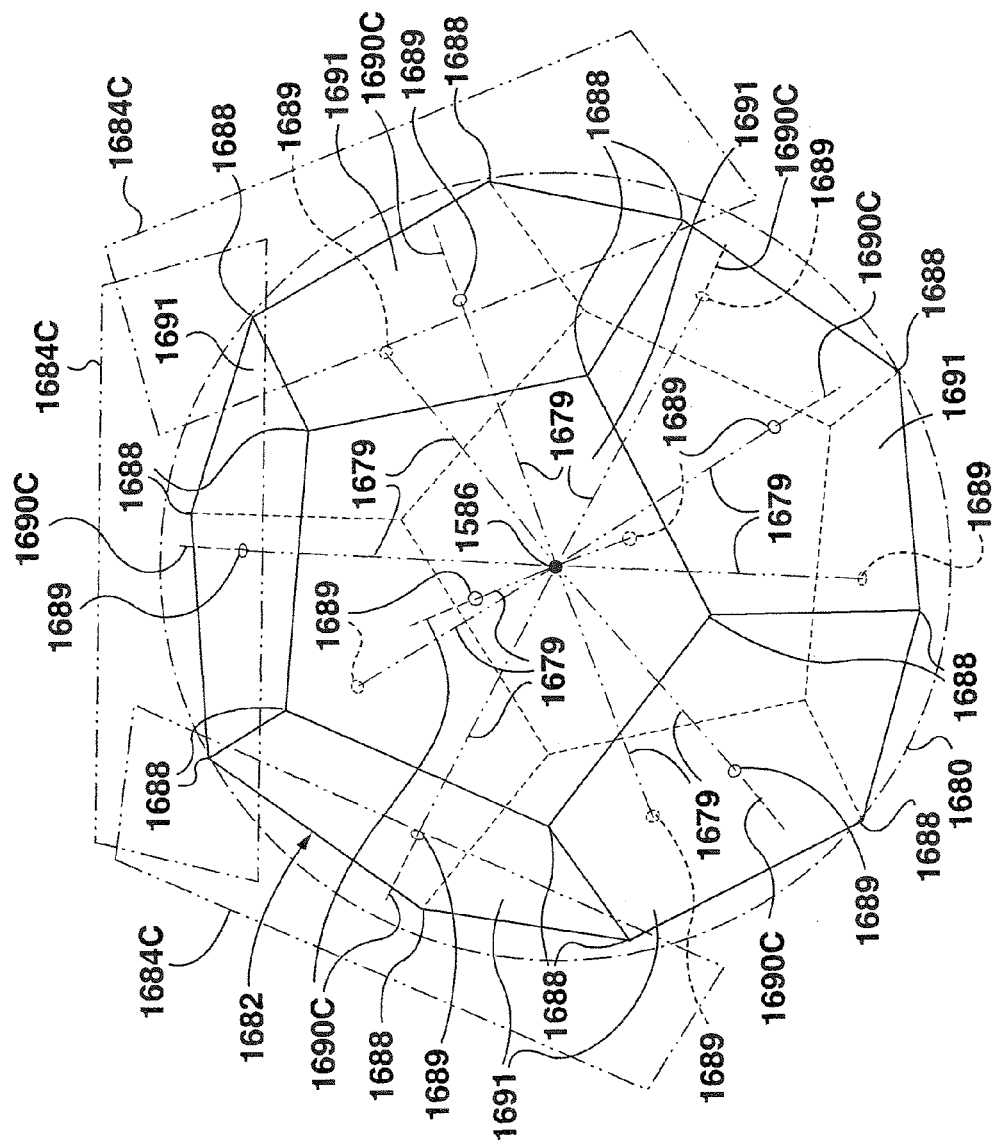
FIG. 16C shows a geometric arrangement of image planes for images to be used to generate a spherical image according to the method of FIG. 11 where the notional Platonic solid is a notional dodecahedron and the surrounding points are centroids of the faces of the notional dodecahedron.

FIGS. 16A and 16C show geometry where the notional Platonic solid is a dodecahedron.

Geometry for an embodiment in which the notional Platonic solid is a notional dodecahedron 1682 and the selected set of surrounding points is the set of all vertices 1688 of the notional dodecahedron 1682 is shown in FIG. 16A. In this embodiment, a set of twenty images is received at step 1102. The twenty images each define an image plane 1684A that represents a field of view from a unique vertex 1688 of the notional dodecahedron 1682 outwardly along an optical axis 1690A substantially collinear with a notional line 1678 between the centroid 1686 of the notional dodecahedron 1682 and the respective vertex 1688. For ease of illustration, only a representative set of image planes 1684A, optical axes 1690A and notional lines 1678 are shown. The image plane 1684A is substantially normal to the line 1678 between the centroid 1686 of the notional dodecahedron 1682 and the respective vertex 1688. FIG. 16A further shows a notional sphere 1680. The notional sphere 1680 may be used at step 1108 described below, and has a surface intersecting the vertices 1688 of the notional dodecahedron 1682 and is also centred on the centroid 1686 of the notional dodecahedron 1682, with the image plane 1684A of each image substantially tangential to the notional sphere 1680.

FIG. 16C shows geometry for an embodiment in which the notional Platonic solid is a notional dodecahedron 1682 and the selected set of surrounding points is the set of all centroids 1689 of faces 1691 of the notional dodecahedron 1682. In this embodiment, a set of twelve images is received at step 1102, that is, one image for each face. The twelve images each define an image plane 1684C that represents a field of view from the centroid 1689 of a unique vertex 1691 of the notional dodecahedron 1682 outwardly along an optical axis 1690C substantially collinear with a notional line 1679 between the centroid 1686 of the notional dodecahedron 1682 and the centroid 1689 of the respective face 1691. Similarly to FIG. 16A, for simplicity of illustration, only a representative set of image planes 1684C, optical axes 1690C and notional lines 1679 are shown. As in the other cases in which the selected surrounding points are centroids of faces, the image plane 1684C is substantially normal to the line 1679 between the centroid 1686 of the notional dodecahedron 1682 and the centroid 1689 of the respective face 1691. FIG. 16C further shows the notional sphere 1680, which may be used at step 1108 described below, and which has a surface intersecting the vertices 1688 of the notional dodecahedron 1682 and is also centred on the centroid 1686 of the notional dodecahedron 1682, with the image plane 1684C of each image substantially tangential to the notional sphere 1680.

At optional step 1106, the method 1100 corrects the images for distortion, for example as described above in respect of the method 400.

At step 1108, the method 1100 assigns, to each pixel in each image, a spherical coordinate on a notional sphere according to a cylindrical projection that is aligned with the image plane for that image. As noted above, the notional sphere used in this procedure intersects the vertices of the notional Platonic solid, is centred on the centroid of the notional Platonic solid, and the image plane of each image is substantially tangential to the notional sphere.

Alignment of the cylindrical projection with the image plane for each image is achieved by the notional cylinder of the cylindrical projection having its cylinder wall substantially tangential to the image plane of the respective image and its longitudinal axis intersecting the centroid of the notional Platonic solid in a manner analogous to that shown and described above in respect of the method 400 shown in FIG. 4. As noted above, assigning the spherical coordinates to the pixels in each image according to a cylindrical projection that is individually aligned with the image plane for that specific image achieves a good fit between the images and the notional sphere. As with the method 400, in the exemplary method 1100 the cylindrical projection is preferably a Miller cylindrical projection, although other cylindrical projections may also be used.

Figure 13B:
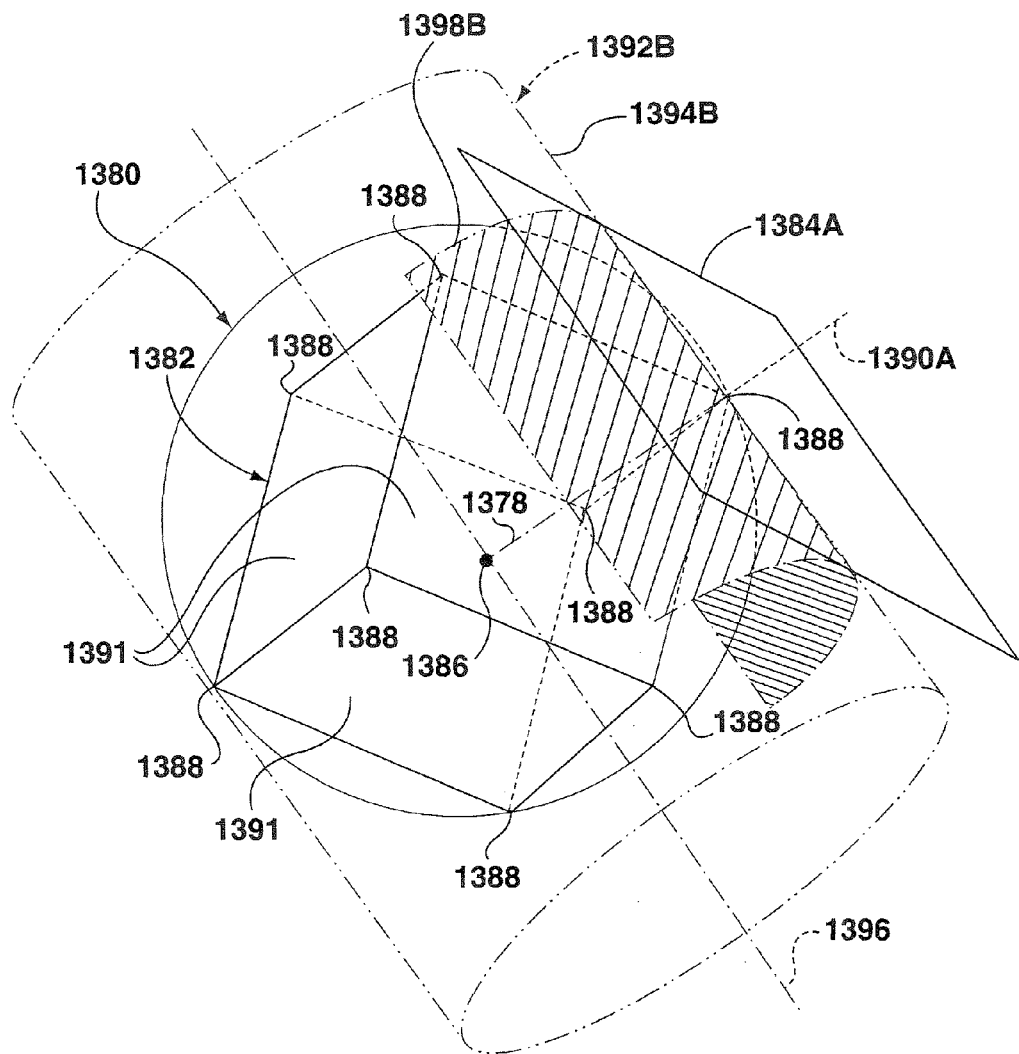
FIG. 13B shows an exemplary orientation of the notional cylinder of a cylindrical projection in which the cylindrical projection is aligned with an image plane in the geometric arrangement shown in FIG. 13A.
Figure 13D:
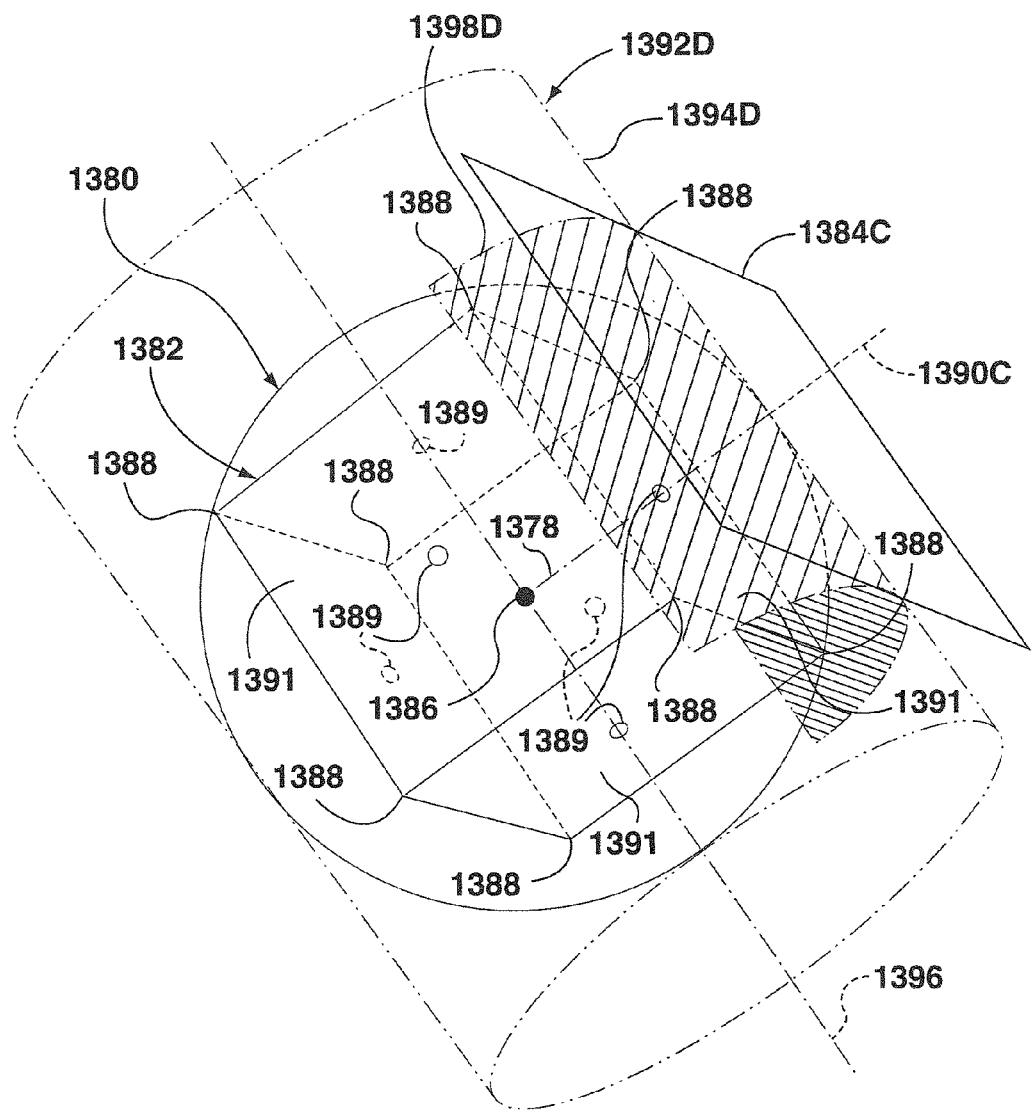
FIG. 13D shows an exemplary orientation of the notional cylinder of a cylindrical projection in which the cylindrical projection is aligned with an image plane in the geometric arrangement shown in FIG. 13C.

FIG. 13B shows the orientation of a notional cylinder 1392B for a cylindrical projection aligned with one of the image planes 1384A in the case where the notional Platonic solid is a notional cube 1382 and the surrounding points are the vertices 1388 thereof, and FIG. 13D shows the orientation of a notional cylinder 1392D for a cylindrical projection aligned with one of the image planes 1384C in the case where the notional Platonic solid is a notional cube 1382 and the surrounding points are the centroids 1389 of the faces 1391 of the notional cube 1382. In each case, the image plane 1384A, 1384C can be treated mathematically as if it were a part 1398B, 1398D of the cylinder wall 1394B, 1394D that has been "unrolled" from around the notional sphere 1380, thereby enabling the spherical coordinates to be assigned to the pixels in that image. As can be seen, the longitudinal axis 1396B, 1396D of the cylinder 1392B, 1392D intersects the centroid 1386 of the notional cube 1382.

Figure 14D:
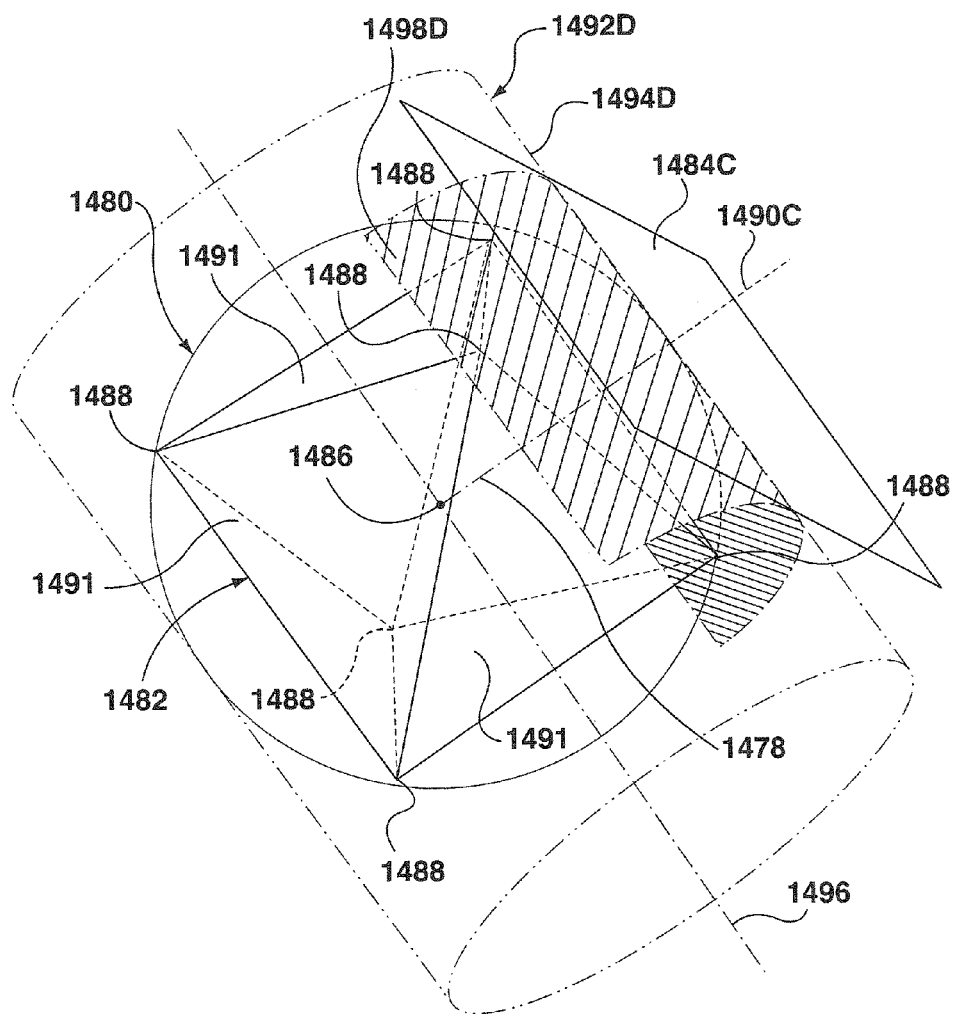
FIG. 14D shows an exemplary orientation of the notional cylinder of a cylindrical projection in which the cylindrical projection is aligned with an image plane in the geometric arrangement shown in FIG. 14C.

Reference is now made to FIGS. 14B and 14D. FIG. 14B shows the orientation of a notional cylinder 1492B for a cylindrical projection aligned with one of the image planes 1484A in the case where the notional Platonic solid is a notional octahedron 1482 and the surrounding points are the vertices 1488. FIG. 14D shows the orientation of a notional cylinder 1492D for a cylindrical projection aligned with one of the image planes 1484C in the case where the notional Platonic solid is a notional octahedron 1482 and the surrounding points are the centroids 1489 of the faces 1491 of the notional octahedron 1482. In both cases, the longitudinal axis 1496B, 1496D of the cylinder 1492B, 1492D intersects the centroid 1486 of the notional octahedron 1482. This alignment of the cylindrical projection with the image plane 1484A, 1484C enables the image plane 1484A, 1484C to be treated mathematically as if it were an "unrolled" part 1498B, 1498D of the cylinder wall 1494B, 1494D so that the spherical coordinates can be assigned to the pixels in that image.

Figure 15D:
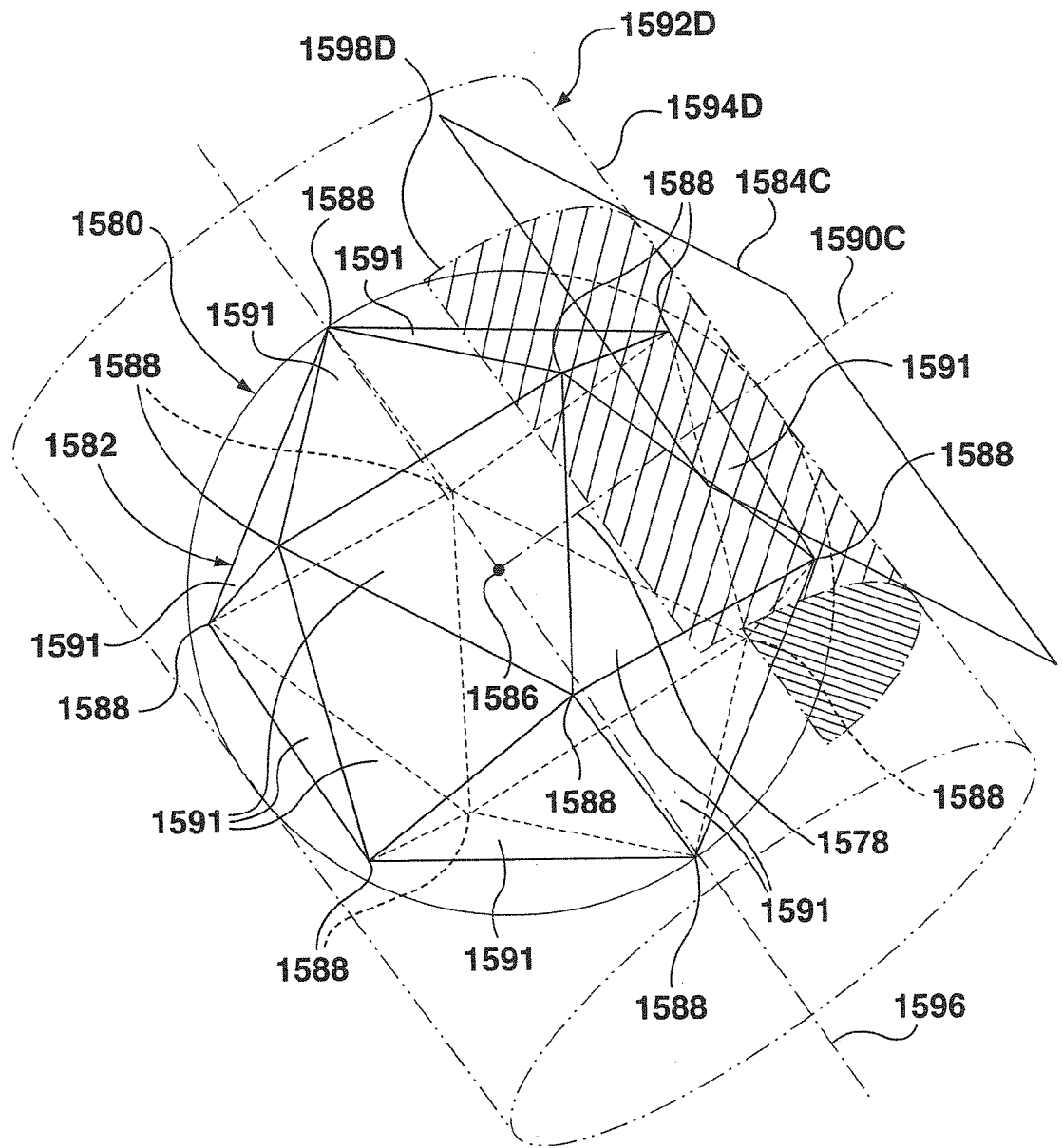
FIG. 15D shows an exemplary orientation of the notional cylinder of a cylindrical projection in which the cylindrical projection is aligned with an image plane in the geometric arrangement shown in FIG. 15C.

FIG. 15B shows the orientation of a notional cylinder 1592B for a cylindrical projection aligned with one of the image planes 1584B in the case where the notional Platonic solid is a notional icosahedron 1582 and the surrounding points are the vertices 1588, while FIG. 15D shows the orientation of a notional cylinder 1592D for a cylindrical projection aligned with one of the image planes 1584D in the case where the notional Platonic solid is a notional icosahedron 1582 and the surrounding points are the centroids 1589 of the faces 1591 of the notional icosahedron 1582. With the cylindrical projection so aligned, the image plane 1584B, 1584D can be treated mathematically as if it were a part 1598B, 1598D of the cylinder wall 1594B, 1594D that has been "unrolled" from around the notional sphere 1580. This permits assignment of the spherical coordinates to the pixels in that image.

Figure 16D:
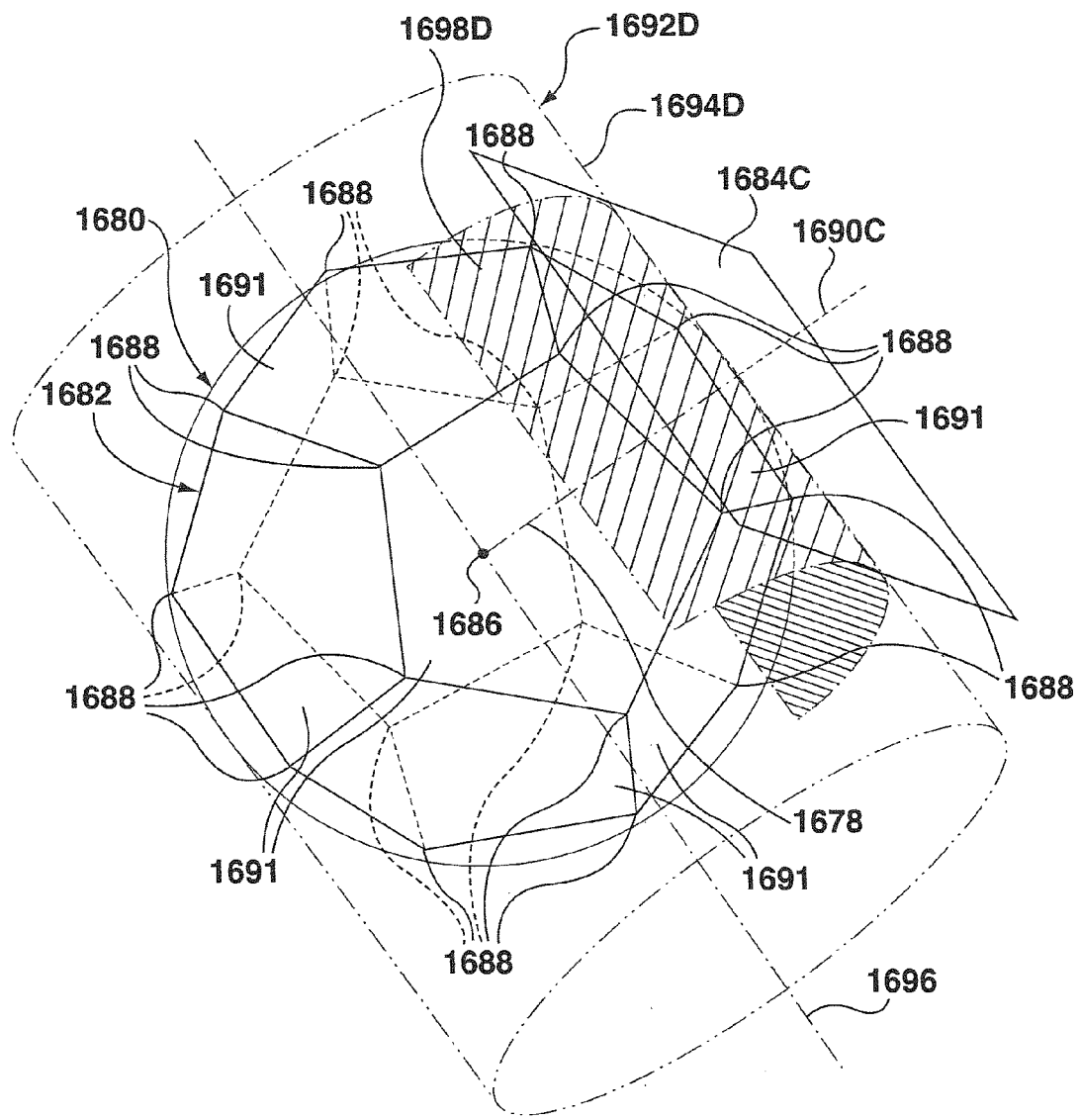
FIG. 16D shows an exemplary orientation of the notional cylinder of a cylindrical projection in which the cylindrical projection is aligned with an image plane in the geometric arrangement shown in FIG. 16C.

Orientations of a notional cylinder 1692A, 1692B for a cylindrical projection aligned with one of the image planes 1684A, 1684B are shown in FIGS. 16B and 16D, respectively, for the case where the notional Platonic solid is a notional dodecahedron 1682. FIG. 16B shows the orientation where the surrounding points are the vertices 1688, while FIG. 16D shows the orientation the surrounding points are the centroids 1689 of the faces 1591. The illustrated alignment allows the image plane 1684A, 1684C to be treated mathematically as an "unrolled" part 1698B, 1698D of the cylinder wall 1694B, 1694D, so as to enable the spherical coordinates to be assigned to the pixels in that image.

In each of the above cases, whether the notional Platonic solid is a notional tetrahedron, notional cube, notional octahedron, notional dodecahedron or notional icosahedron, and whether the surrounding points are the vertices or the centroids of the faces, the spherical coordinates are assigned to each image according to a cylindrical projection whose notional cylinder is specifically aligned with the image plane of that image. The spherical coordinates may be assigned to the respective pixels according to a precalculated lookup table derived from the cylindrical projection, and such a lookup table may include position adjustments for distortion correction in addition to being derived from the cylindrical projection.

Returning now to FIG. 11, at step 1110 the method 1100 uses the spherical coordinates assigned at step 1108 to assign colours derived from the pixels to pixel positions in a spherical image according to a spherical image template. Like the method 400, in the method 1100 the spherical image template is preferably an equirectangular image template.

Assigning the spherical coordinates to each pixel in each image will result in unique pixels and pixel groups. Thus, step 1110 of the method 1100 may be substantially identical to step 410 of the method 400, and for such an embodiment FIG. 10 illustrates the substeps 1110A, 1110B and 1110C of step 1110 of the method 1100 in addition to the substeps of step 410 of the method 400.

Similarly to step 410 in the method 400, the step 1110 of the method 1100 may comprise substeps 1110A and 1110B as shown in FIG. 10. At substep 1110A, the method 1100 assigns, to each pixel position in the spherical image that maps to a spherical coordinate assigned to a unique pixel, the colour of that unique pixel, and at substep 1110B, the method 1100 assigns, to each pixel position in the spherical image that maps to a spherical coordinate assigned to a pixel group, a colour blended from the pixels in that pixel group.

Also similarly to the method 400, the method 1100 may avoid empty spaces in the resulting spherical image by including in step 1110 a further substep 1110C of assigning, to each pixel position in the spherical image that maps to a spherical coordinate remaining unassigned to any pixel, a colour determined by oversampling nearby pixel positions in the spherical image. Steps 1110A and 1110B may be carried out in any order, or substantially simultaneously, while step 1110C should be carried out after steps 1110A and 1110B to populate the other pixel positions so as to support the oversampling at substep 1110C.

The methods described herein may be implemented on any suitable computer or microprocessor-based system, such as a desktop or laptop computer or a mobile wireless telecommunication computing device, such as a smartphone or tablet computer, which may receive images captured by a Platonic imaging system, for example a tetrahedral imaging system as described above. The processing of the set of images into a single spherical image can be completed on these off-board devices, either for a single spherical image or a spherical video feed. This allows for processing of high-definition video images at standard video frame rate by utilizing computational capabilities of the off-board technology. The computer or microprocessor-based system may be coupled directly to the Platonic imaging system with a wired or wireless connection, or may obtain the images from a separate storage medium or network connection such as the Internet.

Figure 17:
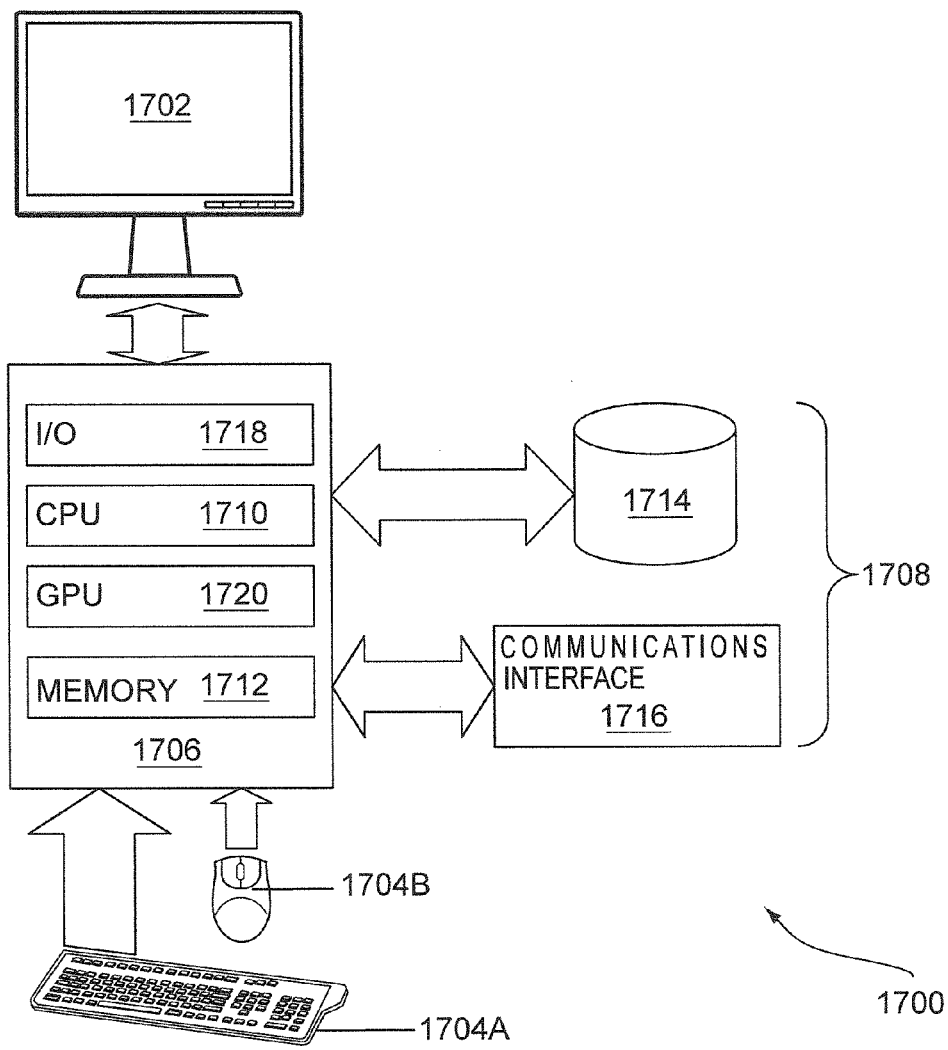
FIG. 17 is a schematic representation of an exemplary computer system, which may be used in implementing various methods described herein.

An illustrative computer system in respect of which the methods herein described may be implemented is presented as a block diagram in FIG. 17. The illustrative computer system is denoted generally by reference numeral 1700 and includes a display 1702, input devices in the form of keyboard 1704A and pointing device 1704B, computer 1706 and external devices 1708. While pointing device 1704B is depicted as a mouse, it will be appreciated that other types of pointing device may also be used.

The computer 1706 may contain one or more processors or microprocessors, such as a central processing unit (CPU) 1710. The CPU 1710 performs arithmetic calculations and control functions to execute software stored in an internal memory 1712, preferably random access memory (RAM) and/or read only memory (ROM), and possibly additional memory 1714. The additional memory 1714 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1714 may be physically internal to the computer 1706, or external as shown in FIG. 17, or both.

The computer system 1700 may also include other similar means for allowing computer programs or other instructions to be loaded. Such means can include, for example, a communications interface 1716 which allows software and data to be transferred between the computer system 1700 and external systems and networks. Examples of communications interface 1716 can include a modem, a network interface such as an Ethernet card, a wireless communication interface, or a serial or parallel communications port. Software and data transferred via communications interface 1716 are in the form of signals which can be electronic, acoustic, electromagnetic, optical or other signals capable of being received by communications interface 1716. Multiple interfaces, of course, can be provided on a single computer system 1700.

Input and output to and from the computer 1706 is administered by the input/output (I/O) interface 1718. This I/O interface 1718 administers control of the display 1702, keyboard 1704A, external devices 1708 and other such components of the computer system 1700. The computer 1706 also includes a graphical processing unit (GPU) 1720. The latter may also be used for computational purposes as an adjunct to, or instead of the (CPU) 1710, for mathematical calculations.

The various components of the computer system 1700 are coupled to one another either directly or by coupling to suitable buses.

Figure 18:
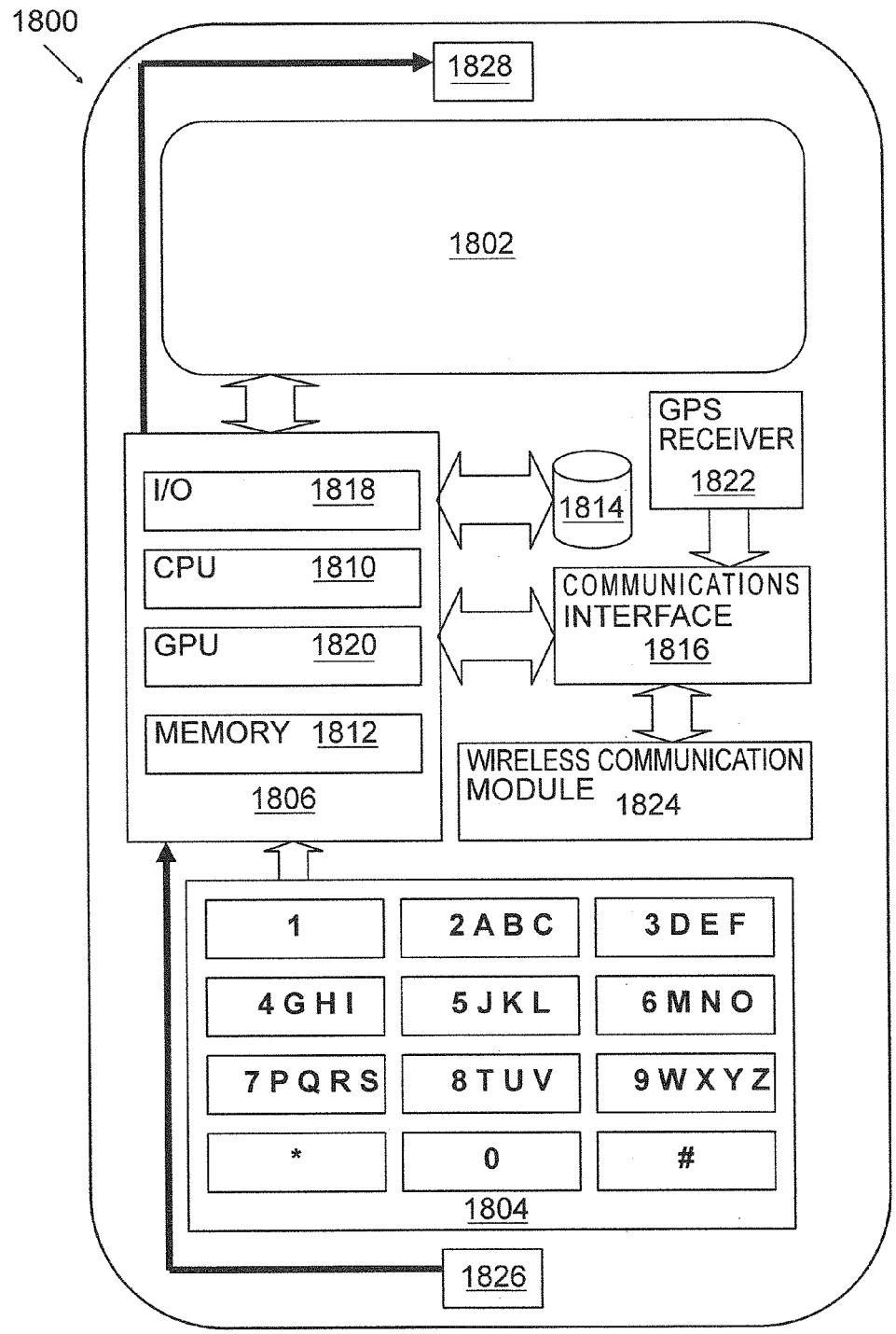
FIG. 18 is a schematic representation of an exemplary smartphone, which may be used in implementing various methods described herein.

FIG. 18 shows an exemplary networked mobile wireless telecommunication computing device in the form of a smartphone 1800. The smartphone 1800 includes a display 1802, an input device in the form of keyboard 1804 and an onboard computer system 1806. The display 1802 may be a touchscreen display and thereby serve as an additional input device or as an alternative to the keyboard 1804. The onboard computer system 1806 comprises a central processing unit (CPU) 1810 having one or more processors or microprocessors for performing arithmetic calculations and control functions to execute software stored in an internal memory 1812, preferably random access memory (RAM) and/or read only memory (ROM) and is coupled to additional memory 1814 which will typically comprise flash memory, which may be integrated into the smartphone 1800 or may comprise a removable flash card, or both. The smartphone 1800 also includes a communications interface 1816 which allows software and data to be transferred between the smartphone 1800 and external systems and networks. The communications interface 1816 is coupled to one or more wireless communication modules 1824, which will typically comprise a wireless radio for connecting to one or more of a cellular network, a wireless digital network or a Wi-Fi network. The communications interface 1816 will also typically enable a wired connection of the smartphone 1800 to an external computer system. A microphone 1826 and speaker 1828 are coupled to the onboard computer system 1806 to support the telephone functions managed by the onboard computer system 1806, and GPS receiver hardware 1822 may also be coupled to the communications interface 1816 to support navigation operations by the onboard computer system 1806. Input and output to and from the onboard computer system 1806 is administered by the input/output (I/O) interface 1818, which administers control of the display 1802, keyboard 1804, microphone 1826 and speaker 1828. The onboard computer system 1806 may also include a separate graphical processing unit (GPU) 1820. The various components are coupled to one another either directly or by coupling to suitable buses.

The methods described herein may be provided as computer program products comprising a computer readable storage medium, such as non-volatile memory, having computer readable program code embodied therewith for executing the method. Thus, the non-volatile memory would contain instructions which, when executed by a processor, cause the computing device to execute the relevant method.

The above systems and methods may be implemented entirely in hardware, entirely in software, or by way of a combination of hardware and software. In a preferred embodiment, implementation is by way of software or a combination of hardware and software, which includes but is not limited to firmware, resident software, microcode, and the like. Furthermore, the above systems and methods may be implemented in the form of a computer program product accessible from a computer usable or computer readable medium providing program code for use by or in connection with a computer or any instruction execution system. In such embodiments, the computer program product may reside on a computer usable or computer readable medium in a computer such as the memory 1812 of the onboard computer system 1806 of the smartphone 1800 or the memory 1712 of the computer 1706, or on a computer usable or computer readable medium external to the onboard computer system 1806 of the smartphone 1800 or the computer 1806, or on any combination thereof.

Several currently preferred embodiments have been described by way of example. It will be apparent to persons skilled in the art that a number of variations and modifications can be made without departing from the scope of the claims.

What is claimed is:

1. An imaging system, comprising:
   a support frame;
   four image sensors carried by the support frame;
   each image sensor comprising a lens system having an optical axis and a focal plane array aligned with the optical axis of the lens system;
   each image sensor having a field of view that is at least substantially coterminous with the field of view of each adjacent image sensor;
   the image sensors arranged so that:
   the optical axis of each lens system is substantially collinear with a median of a common notional regular tetrahedron;
   each focal plane array is positioned between the lens system of its respective image sensor and a centroid of the notional tetrahedron; and
   each image sensor faces outwardly relative to the centroid of the notional tetrahedron.

2. The imaging system of claim 1, wherein each image sensor has a field of view of at least 129.5 degrees.

3. The imaging system of claim 1, wherein each image sensor has a field of view that overlaps the field of view of each adjacent image sensor.

4. The imaging system of claim 1, wherein each image sensor has a field of view of at least 135 degrees.

5. The imaging system of claim 1, wherein each image sensor has a field of view of at least 165 degrees.

6. The imaging system of claim 1, wherein each image sensor has a field of view of between about 165 degrees and about 170 degrees.

7. A method for generating a spherical image, comprising:
   receiving four images;
   each image defining an image plane representing a field of view from a unique vertex of a notional regular tetrahedron outwardly along an optical axis that is substantially collinear with a notional line between a centroid of the notional tetrahedron and the respective vertex;
   the field of view of each image being at least substantially coterminous with the field of view of each adjacent image;
   assigning, to each pixel in each image, a spherical coordinate on a notional sphere according to a cylindrical projection aligned with the image plane for that image; and
   using the spherical coordinates to assign colours derived from the pixels to pixel positions in a spherical image according to a spherical image template;
   wherein:
   the notional sphere intersects the vertices of the notional tetrahedron;
   the notional sphere is centred on the centroid of the notional tetrahedron; and
   the image plane of each image is substantially tangential to the notional sphere; and and wherein the cylindrical projection is aligned with the image plane for that image by a notional cylinder of the cylindrical projection having its cylinder wall substantially tangential to the image plane and its longitudinal axis intersecting the centroid of the notional tetrahedron.

8. The method of claim 7 wherein the field of view of each image overlaps the field of view of each adjacent image.

9. The method of claim 7, wherein the spherical image template is an equirectangular image template.

10. The method of claim 7, wherein assigning the spherical coordinates to the respective pixels according to the cylindrical projection aligned with the image plane for that image comprises assigning the spherical coordinates to the respective pixels according to a precalculated lookup table derived from the cylindrical projection.

11. The method of claim 10, wherein the spherical coordinates in the precalculated lookup table include position adjustments for distortion correction in addition to being derived from the cylindrical projection.

12. The method of claim 8, wherein assigning the spherical coordinates to each pixel in each image results in:
    unique pixels each having a unique spherical coordinate; and
    pixel groups, each pixel group comprising a plurality of pixels whose spherical coordinates are identical;
    and wherein using the spherical coordinates to assign colours to the pixel positions in the spherical image according to the spherical image template comprises:
    for each pixel position in the spherical image that maps to a spherical coordinate assigned to a unique pixel, assigning the colour of that unique pixel to that pixel position in the spherical image; and
    for each pixel position in the spherical image that maps to a spherical coordinate assigned to the plurality of pixels in a pixel group, assigning to that pixel position in the spherical image a colour blended from the plurality of pixels in the pixel group.

13. The method of claim 12, further comprising:
    for each pixel position in the spherical image that maps to a spherical coordinate remaining unassigned to any pixel, assigning to that pixel position in the spherical image a colour determined by oversampling nearby pixel positions in the spherical image.

14. The method of claim 7, further comprising correcting each image for distortion.

15. The method of claim 7, wherein each image defines an image plane representing a field of view of at least 129.5 degrees.

16. The method of claim 7, wherein each image defines an image plane representing a field of view of at least 135 degrees.

17. The method of claim 7, wherein each image defines an image plane representing a field of view of at least 165 degrees.

18. The method of claim 7, wherein each image defines an image plane representing a field of view of between about 165 degrees and about 170 degrees.

19. The method of claim 7, wherein each image is one image in a video stream comprising a plurality of images.

20. The method of claim 7, wherein:
    the images when received are multiplexed into a single composite image;
    the method further comprising:
    isolating each image from the composite image before finding, for each pixel in each image, the spherical coordinate representing the projection of that pixel onto the surface of the notional sphere.

21. A method for generating a spherical image, comprising:
    receiving a set of images;
    each image defining an image plane representing a field of view from a unique surrounding point of a notional Platonic solid outwardly along an optical axis substantially collinear with a notional line between a centroid of the notional Platonic solid and the respective surrounding point;
    each surrounding point being a member of a set of surrounding points selected from the group consisting of:
    (a) the set of all vertices of the notional Platonic solid; and
    (b) the set of all centroids of faces of the notional Platonic solid;
    the number of images in the set being equal to the number of surrounding points in the selected set of surrounding points for the notional Platonic solid;
    the field of view of each image being at least substantially coterminous with the field of view of each adjacent image;
    assigning, to each pixel in each image, a spherical coordinate on a notional sphere according to a cylindrical projection aligned with the image plane for that image; and
    using the spherical coordinates to assign colours derived from the pixels to pixel positions in the spherical image according to a spherical image template;
    wherein:
    the notional sphere intersects the vertices of the notional Platonic solid;
    the notional sphere is centred on the centroid of the notional Platonic solid; and
    the image plane of each image is substantially tangential to the notional sphere;
    and wherein the cylindrical projection is aligned with the image plane for that image by a notional cylinder of the cylindrical projection having its cylinder wall substantially tangential to the image plane and its longitudinal axis intersecting the centroid of the notional Platonic solid.

22. The method of claim 21 wherein the field of view of each image overlaps the field of view of each adjacent image.

23. The method of claim 21, wherein the spherical image template is an equirectangular image template.

24. The method of claim 21, wherein assigning the spherical coordinates to the respective pixels according to the cylindrical projection aligned with the image plane for that image comprises assigning the spherical coordinates to the respective pixels according to a precalculated lookup table derived from the cylindrical projection.

25. The method of claim 24, wherein the spherical coordinates in the precalculated lookup table include position adjustments for distortion correction in addition to being derived from the cylindrical projection.

26. The method of claim 22, wherein assigning the spherical coordinates to each pixel in each image results in:
    unique pixels each having a unique spherical coordinate; and
    pixel groups, each pixel group comprising a plurality of pixels whose spherical coordinates are identical;
    and wherein using the spherical coordinates to assign colours to the pixel positions in the spherical image according to the spherical image template comprises:
    for each pixel position in the spherical image that maps to a spherical coordinate assigned to a unique pixel, assigning the colour of that unique pixel to that pixel position in the spherical image; and for each pixel position in the spherical image that maps to a spherical coordinate assigned to the plurality of pixels in a pixel group, assigning to that pixel position in the spherical image a colour blended from the plurality of pixels in the pixel group.

27. The method of claim 26, further comprising:

for each pixel position in the spherical image that maps to a spherical coordinate remaining unassigned to any pixel, assigning to that pixel position in the spherical image a colour determined by oversampling nearby pixel positions in the spherical images.

28. The method of claim 21, wherein each image is one image in a video stream comprising a plurality of images.

29. The method of claim 21, wherein the set of surrounding points is the set of all vertices of the notional Platonic solid.

30. The method of claim 21, wherein the set of surrounding points is the set of all centroids of faces of the notional Platonic solid.

* * * * *